United States Patent [19]
Naganuma

[11] Patent Number: 5,483,341
[45] Date of Patent: Jan. 9, 1996

[54] CAVITY DISPERSING MEASURING METHOD AND MEASURING APPARATUS THEREOF

[75] Inventor: Kazunori Naganuma, Kokubunji, Japan

[73] Assignee: Nippon Telegraph & Telephone Corporation, Tokyo, Japan

[21] Appl. No.: 447,497

[22] Filed: May 23, 1995

Related U.S. Application Data

[63] Continuation of Ser. No. 288,502, Aug. 10, 1994, abandoned.

[30] Foreign Application Priority Data

Aug. 11, 1993 [JP] Japan ................................ 5-199648

[51] Int. Cl.$^6$ ....................................................... G01B 9/02
[52] U.S. Cl. .......................................... 356/345; 356/358
[58] Field of Search ................................. 356/345, 358; 372/20

[56] References Cited

FOREIGN PATENT DOCUMENTS

| 2134543 | 5/1990 | Japan . |
| 3216530 | 9/1991 | Japan . |
| 0650847 | 2/1994 | Japan . |

OTHER PUBLICATIONS

"In situ measurement of complete intracavity dispersion in an operating Ti:sapphire femtosecond laser" Knox, Optics Letters, vol. 17, No. 7, Apr. 1, 1992 pp. 514–516.
"Femtosecond Time Domain Measurements of Group Velocity Dispersion in Diode Lasers at 1.5 μm" Hall et al., Journal of Lightwave Technology, vol. 10, no. 5, May 1992, pp. 616–619.
Summaries of papers presented at the Conference on Lasers and Electro-Optics, May 2–7, 1993, Baltimore, Md. Optical Society of America, "Laser-cavity dispersion measurement based on interferometric cross correlation of amplified spontaneous emission" Naganuma, CFB4 pp. 570–573.
"Semiconductor laser cavity dispersion measurement based on interferometric crosscorrelation of amplified spontaneous emission" Naganuma, Appl. Phys. Lett. 64(3) 17 Jan. 1994, pp. 261–263.

*Primary Examiner*—Frank Gonzales
*Assistant Examiner*—Robert Kim
*Attorney, Agent, or Firm*—Spencer, Frank & Schneider

[57] ABSTRACT

In a cavity dispersion measuring method, there are provided the steps of: dividing a light beam emitted from a laser cavity under measurement into first, second, third, and fourth light beams; propagating the first light beam and the second light beam along a first optical path and a second optical path respectively, and superimposing two light beams with each other which have passed through the first and second optical paths respectively to cause the two light beams to interfere with each other, thereby producing a first interference light beam; propagating the third light beam and the fourth light beam along a third optical path whose light path length is variable and a fourth optical path whose light path length is fixed respectively, thereby producing a second interference light beam; controlling the optical path length of the third light path in order that intensity of the second interference light beam is kept constant; adjusting the optical path length of the first optical path in correspondence with the controlled optical path length of the third optical path; measuring the first interference light to obtain a waveform of the light intensity while varying the optical path length of the second optical path in a vicinity; and Fourier-transforming the waveform of the measured light intensity to obtain phase information in a frequency domain, whereby wavelength dispersion of the laser cavity is obtained based on the phase information.

10 Claims, 9 Drawing Sheets

CAVITY DISPERSING MEASURING METHOD AND MEASURING APPARATUS THEREOF

This application is a continuation of application Ser. No. 08/288,502, filed Aug. 10, 1994 now abandoned.

BACKGROUND OF THE INVENTION

1. Field of the Invention

The present invention generally relates to a technique being utilized in developing/adjusting an ultrashort light pulse laser which produces a light pulse whose time interval is shorter than one picosecond. More specifically, the present inventions directed to a technique capable of measuring wavelength dispersion of such a laser cavity.

2. Description of Prior Art

Currently, great development has been made in producing such a light pulse whose time interval is shorter than one picosecond. As a result, it could be recognized that when the light pulses having short time intervals are generated or transmitted, either the wavelength dispersion characteristics of the optical components employed to generate/transmit such light pulses, or the wavelength dispersion characteristics of the optical path consisting of the assembly of these optical components could largely give influences to the shapes of the light pulses.

When such a short duration light pulse passes through, for instance, an optical path whose wavelength dispersion characteristic is rapidly changing, a waveform deforming phenomenon happens to occur. When such an optical component is employed whose wavelength dispersion characteristic is rapidly changed, it is essentially difficult to generate such a light pulse having a short time interval. In particular, as to the optical components employed in the cavity for the ultrashort light pulse laser, since a large number of waveform deformations can be accumulated while the light pulse circulates within the cavity, the wavelength dispersion characteristic of this cavity must be controlled with a high precision. Under such circumstances, the wavelength dispersion characteristic of the laser cavity must be measured with a high precision.

As one possible method for measuring wavelength dispersion of a laser cavity, it is conceivable such a method for measuring wavelength dispersion of an individual optical component employed in the laser cavity with a high precision, and then for summing each of the measured wavelength dispersion to estimate the wavelength dispersion of this laser cavity. As the conventional wavelength dispersion measuring method for such an individual optical element, for instance, Japanese Patent Laying-open No. 2-134543 (Patent Application No. 63-287566) discloses such dispersion measuring method and measuring apparatus that the element under measurement is inserted into one of the arms of the white-light Michelson interferometer, the interference waveform produced by varying the delay time difference are stored, and then the waveform dispersion of this element under measurement is obtained by Fourier-transforming the stored interference waveform to acquire the phase information in the frequency domain, and based on this phase information the wavelength dispersion of the element is calculated. As to the conventional measuring method for the wavelength dispersion of the waveguide type element, for example, Japanese Patent Laying-open No. 3-216530 (Patent Application No. 2-11813) opens such waveguide dispersion measuring method and measuring apparatus that the identical optical coupling system is provided in both arms of the white-light Michelson interferometer, and the wavelength dispersion of the optical coupling system is canceled through which the light is coupled into and out of the waveguide.

However, there are some optical components employed in the laser cavity, the wavelength dispersion characteristic of which greatly depends upon the light incident direction or position to these components For example, "Optics Letter volume 9, pages 150 to 152, in 1984" describes that when the light is incident on such a pair of prism that two pieces of equilateral triangular prism whose apex angles are formed in such a manner that the incoming/outgoing angles of the light form the Brewster angles, are arranged whose bottom edges are located in parallel to each other, so that an anomalous dispersion characteristic is produced in which the group delay time is increased with respect to the wavelength. At this time, the produced dispersion amount greatly depends upon the optical path length over which the light passes through the glass within the prism, namely depends upon the incoming/outgoing positions of the light to the prism. Since in fact, it cannot be expected that the incident condition when the wavelength dispersion of the respective elements is measured is completely equal to that when this element is actually used in the laser cavity, an estimation of this wavelength dispersion of the laser cavity with the respective elements practically becomes ambiguous. Moreover, there are other problems in view of the workloads and time losses that the above-explained measurement should be carried out for the laser cavity which contains at least three elements.

On the other hand, another technique for measuring the wavelength dispersion of the laser cavity thereof (particularly, will be referred to "cavity dispersion" in the specification) has been proposed. This conventional measuring technique will now be briefly described.

FIG. 1 schematically shows the cavity wavelength dispersion measuring method according to the first prior art. This first cavity dispersion measuring method is disclosed in "Optics Letter volume 17, pages 514 to 516, in 1992" as the cavity wavelength dispersion measuring method which has been utilized in measuring of the wavelength dispersion for the titanium sapphire laser cavity.

In FIG. 1, a laser cavity 11 whose wavelength dispersion is to be measured comprises a laser medium 12, a wavelength selecting element 13, a total reflecting endmirror 14 and an output coupling mirror 15. The pulsed oscillation is established by exciting the laser medium 12 by a continuous exciting apparatus 16. It should be noted that as this continuous exciting apparatus 16, there are utilized a continuous wave laser light source, a continuous wave flash lamp, or a continuous current injecting source. The oscillation wavelength "λ" of this laser cavity under measurement is controlled by the wavelength selecting element 13 employed therein.

The laser light output from the laser cavity under measurement is incident upon a photodetector 18 forming an output light pulse train 17 from the output coupling mirror 15. The output light pulse train 17 incident on this photodetector 18 is converted into the electric pulse train. Then, this electric pulse train is supplied to an frequency counter 19 so that the pulse repetition frequency $f(\lambda)$ of this electric pulse train is measured. This measurement is repeatedly carried out while the oscillating wavelength "λ" is sequentially varied by the wavelength selecting element, whereby the pulse repetition frequency $f(\lambda)$ for the respective wavelength is obtained.

Here, the repetition frequency f(λ) is expressed by employing the optical length "T" of the laser cavity 11 under measurement as well as derivative of the cavity optical length by the wavelength as follows:

$$f(\lambda) = c / \left( T - \lambda \frac{dT}{d\lambda} \right) \quad (1)$$

In this formula (1), symbol "c" denotes the light velocity in vacuum. The group delay time "$\tau_d$" of the laser cavity is expressed by the below-mentioned formula containing the derivative of the cavity optical length by the wavelength:

$$\tau_d = \frac{1}{c} \left( T - \lambda \frac{dT}{d\lambda} \right) \quad (2)$$

When this formula (2) is substituted for another formula containing the repetition frequency, the following formula is obtained:

$$\tau_d = \frac{1}{f} \quad (3)$$

The dispersion characteristic of the cavity corresponds to changes the group delay time $\tau_d$ regarding to the wavelength (λ) for the laser cavity. The above-described formula (3) represents the basic formula which expresses the principle to measure the cavity dispersion characteristic according to this conventional measuring method.

In FIG. 2, there is schematically shown another method for measuring cavity wavelength dispersion according to the second prior art. This measuring method is disclosed in "Summaries of Papers presented at the Conference on Lasers and Electro-Optics, May 2–7, 1993, pages 570 to 573".

In accordance with this second measuring method, a laser cavity 21 under measurement is excited below the oscillation threshold value. At this time, fluorescent light (namely, amplified spontaneous emission light) emitted from the laser cavity 21 under measurement is used for the wavelength dispersion measurement. This fluorescent light may be made parallel light beams by using the optical means for increasing the parallelism of the light beams, e.g., the optical fiber, if required.

In this measuring apparatus, the Michelson interferometer comprises a cube beam splitter 22, a fixed mirror 23 and a scanning mirror 24. The light beam emitted from the laser cavity 21 under measurement is divided into the first and second light beams by the cube beam splitter 22. In this case to increase parallelism of the light beam emitted from the laser cavity 21, a single mode optical fiber 28 and coupling lenses 29 and 30 provided on both ends of this optical fiber 28 are employed between this laser cavity 21 and the beam splitter. The first deviled light beam is propagated toward the fixed mirror 23 to be reflected thereon, and then the reflected first light beam is returned (via the first light path) to the cube beam splitter 22. On the other hand, the second divided light beam is propagated toward the scanning mirror 24 to be reflected thereon, and then the reflected second light beam is returned (via the second light path) to the cube beam splitter 22. Thereafter, both the first and second light beams returned to the cube beam splitter 22 are superimposed with each other, thereby producing the interference light. This interference light is incident upon a photodetector 25. The photodetector 25 converts intensity of this interference light into the corresponding voltage value to measure the power of the interference light.

Under this condition, the position of the scanning mirror 24 is moved along the second optical path in one direction in a vicinity where the relative difference $L_1$ between the first optical path and the second optical path becomes N times of the cavity length of the laser cavity under measurement, N being any integer other than zero. Then, the output voltage values of the photodetector 25 are sequentially stored into a waveform memory 26 every time the relative difference $L_1$ between the optical path lengths is varied by a predetermined step. Thus, the data stored in the waveform memory 26 are Fourier-transformed by a computer 27 to obtain the phase information. Based on this phase information in the frequency domain, the wavelength dispersion characteristic of the laser cavity 21 under measurement can be obtained.

In general, a change suffered by the electric field while light having an angular frequency "ω" is traveled around a cavity is expressed by a complex number t(ω) called as a transfer function of this cavity. The absolute value of this cavity transfer function responds to a change in intensity of an electric field, and a phase of this cavity transfer function represents a change in phases of the electric field.

In a vicinity where the measurement is carried out and the optical path length becomes N times of the cavity length of the laser cavity under measurement (N being any integer other than zero), the voltage value derived from the photodetector 25 and stored in the waveform memory 26 is expressed by $S_N(\tau)$ as a function of the delay time "τ" defined by dividing the relative optical path length difference by the light velocity. In case that the phase imbalance between both arms in the measuring interferometer constructed of the cube beam splitter 22, the fixed mirror 23, and the scanning mirror 24, is negligible, the Fourier-transformed signal $S_N(\tau)$ is expressed by the following formula (4):

$$F[S_N(\tau)] = t^N(\omega) U(\omega) \quad (4)$$

In this formula (4), where symbol "F" denotes the Fourier transformation, and symbol "U(ω)" denotes optical spectrum.

The optical spectrum is always the positive real number. As a consequence, the phase as the complex number of the formula (4) always reflects only the phase of t(ω), namely the change φ(ω) in the phase, which is suffered by the electric field while the light is traveled inside the cavity. In other words, it is expressed by the following formula (5):

$$\arg(F[S_N(\tau)]) = N\phi(\omega) \quad (5)$$

Here, based upon the obtained phase change φ(ω), the cavity group delay time "$\tau_d$" may be calculated in accordance with the following formula (6):

$$\tau_d(\omega) = d\phi(\omega)/d\omega \quad (6)$$

As a consequence, the above-described formula (5) corresponds to the basic formula which expresses the principle to measure the cavity dispersion characteristic according to the second conventional measuring method.

As the method for measuring difference with a the optical path lengths with a high precision, the measuring method using a monochromatic laser light source 31 with linearly polarized light as the reference light source. In FIG. 2, the laser light beam emitted from the monochromatic laser light source 31 is reflected on a reflecting mirror 32 toward the cube beam splitter 22, and is divided into the first and second light beams by the cube beam splitter 22. The first divided light beam is propagated toward the fixed mirror 23 to be reflected thereon, and then the reflected first light beam is returned to the cube beam splitter 22. On the other hand, the second divided light beam is propagated toward the scanning mirror 24. This second divided light beam passes a 1/8 wave plate 33 placed between the cube beam splitter 22 and the scanning mirror 24, and then is reflected by the scanning mirror 24, and thereafter passes through the 1/8 wave plate 33 to the reverse direction. As a result of this twice propagation by the laser light beam, an equivalent effect may be achieved in which the laser light beam has passed through the 1/4 wave plate, so that the linearly polarized light is converted into the circularly polarized light.

The linearly polarized light emitted from the monochromatic laser light source 31 is incident upon the Michelson interferometer. A He—Ne laser whose oscillation waveform is 632.8 nm is used as the monochromatic laser light source 31. The laser light derived from this monochromatic laser light source 31 is linearly polarized light having such a polarization plane inclined at 45 degrees with respect to the paper plane of FIG. 2. This linearly polarized light is divided by the cube beam splitter 22. One divided beam of this linearly polarized light beam is reflected by the fixed mirror 23, and then is returned to the cube beam splitter 22. The other divided beam of this linearly polarized light beam is reflected by the scanning mirror 24, and converted into the circularly polarized light beam, as previously explained, and thereafter returned to the cube beam splitter 22. Thus, two light beams which have returned to the cube beam splitter 22 are superimposed with each other, and the superimposed light beam forms the interference light. The interference light having the wave length of 632.8 nm from the Michelson interferometer is incident upon a polarizing beam splitter 35 via a reflecting mirror 34 to be separated into both a polarization component located perpendicular to the paper plane of FIG. 2 and a polarization component parallel to this paper plane. The light intensity of the respective polarization components is converted into a voltage value by the respective photodetectors 36 and 37. These two interference voltage signals have phases mutually different from each other by 90 degrees, and are input into a trigger signal generator 38. From the trigger signal generator 38, a voltage pulse is generated as the trigger signal in response to the two voltage signals every time the difference L in the optical path lengths is varied by a half of the waved length of 632.8 nm, namely 316.4 nm. In response to this trigger signal, the waveform memory 26 sequentially stores therein the output voltage values of the photodetector 25 when this voltage pulse (trigger signal) is produced. A series of voltage signals sequentially stored in the waveform memory 26, namely the interference signals are read by the computer 27 to be processed by the Fourier transformation.

However, the above-explained conventional cavity dispersion measuring methods bear the below-mentioned problems:

As the first problem of the first conventional dispersion measuring method, there is such a problem that the laser cavity under measurement is excited by the continuous exciting apparatus, under which the pulsed oscillation must be established. Such a requirement is not always satisfied by the various sorts of laser apparatuses.

As the method for realizing the pulsed oscillation in the laser, at least three pulse oscillation modes may be conceived, i.e., the forced mode-locking, the hybrid mode-locking, and the passive mode-locking. In both the forced mode-locking and the hybrid mode-locking, either the modulation signal or the excitation pulse is externally applied whose time interval is equal to the round-trip time of the laser cavity. In this case, the repetition period of the produced pulsed oscillation is always, the precisely, equal to the period of signal which is externally applied, and does not depend upon the oscillation wavelength. As a result, with regard to either the forced mode-lock type laser cavity, or the hybrid mode-lock type laser cavity, the dispersion measurement cannot be carried out with the conventional cavity dispersion measuring method.

As the second problem of the first conventional measuring method, the laser cavity under measurement must employ the wavelength selecting element for controlling the oscillation wavelength.

In general, the laser oscillation occurs at a constant wavelength determined by such a combination between the wavelength-dependent gain for the laser medium, and the wavelength dependent loss in the cavity. The dispersion characteristic of the cavity under measurement is the amount involving the wavelength derivative of the repetition frequency. Accordingly, the measurement should be necessarily carried out for the repetition frequencies under at least two different lasing wavelengths. Therefore, the lasing wavelengths must be forcedly changed by employing the wavelength selecting element within the cavity.

As is known in the art, the wavelength dependent gain is varied by such operating conditions as the excitation intensity, or the temperature in a certain sort of laser medium, for instance, a semiconductor. It might be conceived that the lasing wavelength is varied by changing these conditions. However, since such a change in the operating condition of the laser medium would inevitably cause a change in the dispersion characteristic of this laser medium, it is not allowable to change the operating condition thereof. This is because the cavity dispersion characteristic under constant operating condition is the subject of the measurement. As a consequence, the wavelength selecting element must be provided within the laser cavity under measurement. Moreover, for the purpose of this measurement, it is required to employ such a wavelength selecting element having a negligible change in the dispersion characteristic of this element accompanying the wavelength selection operation.

Hence, since the wavelength selecting element employed in the cavity will more or less induce an expansion of the width of the generated pulse in the ultrashort pulse laser, such a wavelength selecting element is not often utilized. In this case, it is inconvenient to temporarily install such a wavelength selecting element in order only to perform the measurement of the cavity dispersion. Moreover, to obtain dispersion of the original cavity under such a normal state without the wavelength selecting element, the dispersion characteristic of this wavelength selecting element must be measured using the dispersion measuring method for the individual elements. In addition, for example, in individual case of the monolithic mode-lock type semiconductor laser, it is inherently impossible to additionally employ such a wavelength selecting element within a cavity after this laser has been manufactured.

The above-explained first and second problems of the conventional dispersion measuring methods restrict the subject to be measured. In addition to this subject limitation, the response time of the photodetector employed in the first conventional measuring method must be sufficiently fast compared the round-trip time of the cavity. This requirement may be easily satisfied with the commercially available PIN photodetector when the length of the laser cavity is long, e.g., 1.5 m, namely the round-trip time of the cavity is in the order of 10 nanoseconds. Actually, the dispersion measurement is carried out on such a long cavity laser as described in the above-mentioned publications. However, in case of such a short cavity laser as a semiconductor laser having a cavity length of approximately 300 micrometers, the round-trip time of the cavity is rather short, e.g., approximately 7 picoseconds. Here, there is no commercially available photodetector capable of responding to the above short round-trip time of the cavity. As a result, the dispersion measurement could not be carried out by the first conventional method with respect to such a short cavity laser. A similar highspeed response characteristic is required to the frequency counter placed after the photodetector. As a result, the dispersion measurement for the short cavity laser is practically difficult by the first conventional dispersion measuring method.

As a consequence, the first conventional dispersion measuring method strictly requires the following two conditions as to the laser cavities to be measured:

(1) The pulse oscillation is established under the continuous excitation.

(2) The oscillation wavelength of the laser is controlled by such a wavelength selecting element having a very small variation in the dispersion characteristic thereof.

Accordingly, only limited sort of laser cavities can be measured. Moreover, since both the photodetector and the frequency counter under use must be sufficiently responding to the round-trip time of the cavity, it is practically difficult to measure the cavity dispersion characteristic of a short cavity laser. These problems of the first conventional measuring method are in principle solved by the second conventional measuring method. That is, the laser cavity under measurement is excited under the oscillation threshold value and no laser oscillation occurs in this second conventional dispersion measuring method, so that the above-described problems such as limitations in the oscillation mode and selectivities of the oscillation wavelength can be solved.

Furthermore, in the second conventional measuring method, the interferometer is utilized, and then the time axis can be produced with a high precision based on the relative difference in the optical path lengths between the two arms of this interferometer, namely the difference in the delay times. The measuring precision of the optical path length difference reaches 1 micrometer even in a simple measuring system, and several nm when the interferometric ranging method is utilized. This length precision corresponds to 3 to 0.02 femtoseconds with respect to the precision of the delay time difference. Equivalent time resolution may be determined by this delay time precision. There is completely no relationship between this time resolution and the response time of the photodetector used for receiving the light emitted from the interferometer. As a result, however short cavities are employed, the dispersion characteristics thereof could be measured. Therefore, above limitation caused by the response time of the photodetector and the electronic circuit can also be solved with the second conventional measuring method.

However, the second conventional measuring method owes to an assumption that the optical length of the laser cavity under measurement is kept constant. When the optical length of the laser cavity under measurement would be varied during the dispersion measurement, even if the relative difference in the optical path lengths of the measuring interferometer has been calibrated with a high precision, the result indicated in the above formula (4) could not be obtained after the detected interference signal is Fourier-transformed. This is because the relative difference in the optical path lengths concerning the formula (4) is defined relative to the optical path length of the laser cavity under measurement. As a consequence, the variation in the optical lengths of the laser cavity under measurement is equal to errors in the relative optical path length difference.

Assume now that the light velocity is "c", and the interference signal is acquired every an interval "$c\Delta\tau$" of the relative optical path length difference of the interferometer. At this time, the results of the Fourier transformation are decomposed into the Fourier components from "$\omega=0$" to "$\omega=\pi/\Delta\tau$" in accordance with the well known sampling theorem. The upper end $\omega_{NYQ}$ of this angular frequency expressed in the components corresponds to the well known Nyquist frequency expressed as the angular frequency. This upper end $\omega_{NYQ}$ must be selected to be larger than the light angular frequency $\omega_L=2\pi C/\lambda_L$ corresponding to the short wavelength end $\lambda_L$ of the fluorescent light emitted from the laser cavity under measurement. That is to say, $\omega_{NYQ}>\lambda_L$. This requirement is provided so as to prevent aliasing accompanying the Fourier transformation of the discrete data. This aliasing is that, when the original signal contains the high-frequency components over the Nyquist frequency, the high-frequency components is folded over the low-frequency components under the Nyquist frequency. Regarding the interval $c\Delta T$ of the optical path length difference, this condition is converted into the following condition of the formula (7) is derived:

$$C\Delta\tau<\lambda_L/2 \qquad (7)$$

As understood from this formula (7), when the short waveform edge of the fluorescent light emitted form the laser cavity under measurement is, for instance, 800 nm, the interference signal must be measured with a step of the optical path length difference shorter than at least 400 nm. To achieve such a fine step, it is necessarily required to calibrate the relative difference in the optical path lengths with a precision of at least several nm.

As previously described, since the variation in the optical lengths of the laser cavity under measurement is equivalent to the variation in the relative optical path lengths, this variation in the optical lengths of the laser cavity under 24 measurement must be maintained at most approximately several tens nm.

For instance, as to a semiconductor having an cavity lengths of approximately 300 micrometers, the optical length of the laser cavity is about 2 mm, and then variations of 150 nm occur in the optical length in connection with a temperature change of 1 degree Centigrade in this semiconductor laser. As a consequence, in order that this variation in the optical lengths is suppressed to the allowable 1 value of the second conventional measuring method, the temperature control with the order of 0.1 degree must be carried out. Such a temperature control may be readily achieved using the recent temperature control technique, so that dispersion of the semiconductor laser cavity having the element length of 300 micrometers is actually measured using the second conventional measuring method.

Here, the allowable width of the temperature variation is inversely proportional to the optical length of the cavity. As a consequence, even in the same semiconductor lasers, in case of such a semiconductor laser as a monolithic mode-lock semiconductor laser having the typical cavity length of 3 mm, the required temperature control becomes on the order of 0.01 degree. To achieve such a high precision temperature control, high-cost temperature controlling apparatuses are required. Consequently, the cavity dispersion of the monolithic mode-lock semiconductor laser cannot be readily measured with this measuring method.

These semiconductor lasers are solid-state devices, and the variations in the cavity optical lengths of these monolithic lasers are rather small. In the typical laser cavity built by surrounding a laser medium with optical components such as mirrors, light is propagated in air in more than half of an optical path inside this cavity. Here, an air flow cannot be avoided by which the variation in the cavity optical lengths is induced. The mechanism for holding such optical components as the mirrors is ceaselessly vibrating because of the ambient vibrations. As a result, these vibrations are propagated to the respective components employed in the cavity, and therefore the optical length of the cavity will be changed. The experimental variation value in the cavity optical lengths of the usual laser cavities is on the order of 500 nm, which does not depend upon the lengths of the cavities. This implies that the major portion of the variations in the cavity optical lengths is induced by the vibrations of the mirrors located at the outer peripheral of the laser cavity. This variation in the cavity optical lengths exceeds the allowable value for the second conventional measuring method. As a result, the usual laser cavities cannot be measured with the second conventional measuring method.

As described above, the second conventional measuring method requires such a condition that the variation in the optical lengths of the laser cavity under measurement should be very small. Therefore, the laser cavity to which the second conventional measuring method is applicable is practically limited to, a semiconductor laser cavity having a short cavity length.

SUMMARY OF THE INVENTION

An object of the present invention is to solve the above-described various problems, and therefore to provide a general-purpose measuring method for a dispersion characteristic of a laser cavity.

Another object of the present invention is to provide such a cavity dispersion measuring method which does not have the following limitations. That is, this dispersion measuring method is not adversely influenced by:

1) sorts of means for establishing pulsed oscillation with a laser cavity under measurement such as continuous-wave excitation, an application of a modulation signal, or pulse excitation;

2) provision of either a wavelength selecting element, or not within the laser cavity under measurement;

3) restriction on the length of the measurable laser cavity by response time of a photodetector and an electronic circuit; and 4) a variation in optical lengths of the laser cavity under measurement.

A further object of the present invention is to provide a general-purpose cavity dispersion measuring apparatus which is not adversely influenced by:

1) sorts of means for establishing pulsed oscillating with a laser cavity under measurement such as continuous-wave excitation, an application of a modulation signal, or pulse excitation;

2) provision of either a wavelength selecting element, or not within the laser cavity under measurement;

3) restriction on the length of the measurable laser cavity by response time of a photodetector and an electronic circuit; and 4) a variation in optical lengths of the laser cavity under measurement.

According to a first aspect of the present invention, there is provided a method for measuring cavity dispersion, comprising the steps of:

dividing a light beam emitted from a laser cavity under measurement into first, second, third, and fourth light beams;

propagating the first light beam and the second light beam along a first optical path and a second optical path respectively, and superimposing two light beams with each other which have passed through the first and second optical paths respectively to cause the two light beams to interfere with each other, thereby producing a first interference light beam;

propagating the third light beam and the fourth light beam along a third optical path whose optical path length is variable and a fourth optical path whose path length is fixed respectively, and superimposing two light beams with each other which have passed through the third and fourth optical paths respectively to cause the two light beams to interfere with each other, thereby producing a second interference light beam;

controlling the optical path length of the third optical path in order that intensity of the second interference light beam is kept constant;

adjusting the optical path length of the first optical path in correspondence with the controlled optical path length of the third optical path;

measuring the first interference light to obtain a waveform of the light intensity while varying the optical path length of the second optical path in a vicinity where a relative optical path difference between the optical path length of the second optical path and the adjusted optical path length of the first optical path length, becomes N times of a cavity length of the laser cavity under measurement, N being any integer other than zero; and Fourier-transforming the waveform of the measured light intensity to obtain phase information in a frequency domain, whereby wavelength dispersion of the laser cavity is obtained based on the phase information.

Here, in a vicinity where a relative difference between the optical path length of the third optical path and the optical path length of the fourth optical path may become N times of the cavity length of the laser cavity under measurement, the optical path length of the third optical path is varied.

The cavity dispersion measuring method may further comprise the steps of:

measuring the first interference light beam to obtain a waveform of light intensity while varying the optical path length of the second optical path in a vicinity where the relative difference between the optical path length of the second light path and the optical path length of the first light path becomes M times of the cavity length of the laser cavity, M being any integer other than the integer N; and acquiring phase information at a frequency domain obtained by Fourier-transforming the light intensity waveform measured at the preceding step, whereby the waveform dispersion of the laser cavity under measurement is obtained based on a difference between the phase information measured for the integer N and the phase information measured for the integer M.

According to a second aspect of the present invention, there is provided a cavity dispersion measuring apparatus comprising:

a first Michelson interferometer including a beam splitter, a first endmirror, and a second end mirror, in which a substantially parallel light beam is divided into two light beams, and after these two split light beams are propagated through mutually different optical paths respectively, the two divided light beams are superimposed with each other thereby to output a first interference light beam;

a second Michelson interferometer including the beam splitter and the first end mirror, which are shared with the first Michelson interferometer, and also a third end mirror, for outputting a second interference light beam;

incident means for causing a light beam emitted from a laser cavity under measurement to be incident upon the first Michelson interferometer and second Michelson interferometer in a parallel form;

first moving means for moving the position of the first end mirror along the incident direction of the light beam;

feedback means for controlling the first moving means in such a manner that intensity of the second interference light derived from the second Michelson interferometer becomes constant;

second moving means for moving the second end mirror in such a manner that a relative difference between the lengths of the two optical paths of the first Michelson interferometer is successively varied as a result, the position of the second end mirror has been moved relative to the position of the third end mirror of the second Michelson interferometer;

measuring means for measuring intensity of the first interference light beam from the first Michelson interferometer in correspondence with the variation in the relative difference between the optical path lengths of the first Michelson interferometer; and calculating means for Fourier-transforming a waveform of light intensity measured by the measuring means to obtain phase information in a frequency domain, whereby a wavelength dispersion characteristic is obtained based on the phase information.

Here, the relative difference between the two optical path lengths of each of the first and second Michelson interferometers may be set to approximately N times of a cavity length of the laser cavity under measurement, N being any integer other than zero.

The incident means may include optical means for increasing a parallelism of the light beam emitted from the laser cavity under measurement.

The calculating means may include means for Fourier-transforming two light intensity waveforms measured with respect to the laser cavity corresponding to the same measuring subject, respectively, to obtain two phase informations in the frequency domain, thereby acquiring the wavelength dispersion characteristic based on the difference between the phase informations.

The first moving means may be arranged by a piezoelectric element.

The cavity dispersion measuring apparatus may further comprise:

a third Michelson interferometer for measuring the difference between the relative difference between the two optical path lengths of the first Michelson interferometer and the relative difference between the two optical path lengths of the second Michelson interferometer under condition that the second end mirror and the third mirror are an end mirror.

The feedback means may generate a difference between intensity of the second interference light beam and a preset reference voltage value, and outputs the difference therefrom through an integrating circuit and an amplifier.

In the dispersion measuring system of the present invention, the light beam from the cavity under measurement is simultaneously incident on two Michelson interferometers after the beam parallism thereof has been increased, if necessary. These two Michelson interferometers share the beam splitter and one end mirror, and are set in a vicinity where each of the relative difference between the optical path lengths becomes N times of the cavity length of the laser cavity under measurement, and N is any integer other than zero. The micro translator device is mounted on this one end mirror, and intensity of the interference light produced from the first Michelson interferometer (will be referred to a "measuring Michelson interferometer" hereinafter) is converted into the corresponding voltage value by the photodetector for conducting the intensity measurement. At this time, the micro translator is driven in such a manner that intensity of the interference light produced by the second Michelson interferometer (will be referred to a "correcting Michelson interferometer" hereinafter) is maintained at the constant value. The output voltage values derived from the photodetector are sequentially stored every time the relative difference in the optical path lengths of the measuring Michelson interferometer is varied by a constant step with respect to the relative difference in the optical path lengths of the correcting Michelson interferometer. Based on such phase information in the frequency domain obtained by Fourier-transforming these stored voltage data, the wavelength dispersion characteristic of this laser cavity under measurement is measured. As a consequence, the cavity dispersion characteristic can be measured in the general-purpose manner without employing a means for established pulsed an oscillation of this laser cavity under measurement, and irrelevant to such a fact whether or not the wavelength selecting element is provided within the laser cavity under measurement, and further not depending upon the response time of the photodetector and the subsequent electronic circuit, and moreover without any adverse influences by the variations in the optical lengths of this laser cavity.

The present invention is the same as the above-explained second conventional measuring method as to such a principle idea that the light beam emitted from the laser cavity under measurement is incident upon the Michelson interferometer, and the wavelength dispersion of the laser cavity under measurement is obtained by Fourier-transforming the interference signal waveform. However, such a featured point of the present invention is completely different from the second conventional dispersion measuring method. That is, even when the optical length of the laser cavity under measurement is varied, the interference signal waveforms can be correctly acquired. This featured point will now be described in detail.

It has been studied why the above-explained problems of the second conventional dispersion measuring method are caused. As a result, it could be recognized that to obtain the wavelength dispersion of the laser cavity under measurement from the Fourier-transformed interference signal waveform, the interference signal waveform must be acquired with respect to the optical path difference relative to the optical length of the laser cavity under measurement, but in the conventional measuring method the interference signal waveforms were acquired with respect to the absolute optical path difference. In other words, when the optical length of the laser cavity under measurement would be changed, the optical path length difference for the interference signal waveform should be accordingly varied. However, this adjustment was not carried out in the conventional measuring method.

On the contrary, according to the dispersion measuring method of the present invention, the optical length of the laser cavity under measurement is continuously monitored, and then the optical path length difference related to the acquisition of the interference signal waveform is automatically corrected following to the monitored variation in the optical lengths of the laser cavity under measurement. With the present invention, to monitor the optical length of the laser cavity under measurement, a separate interferometer is additionally employed in addition to the interferometer used to acquire the interference signal waveform. To automatically correct the optical path length difference, the dispersion measuring apparatus of the present invention is so arranged that the beam splitter and one end mirror are commonly used by the two interferometers, and this end mirror is moved by the micro translator following the variation in the optical lengths of the laser cavity under measurement.

DETAILED DESCRIPTION OF THE PREFERRED EMBODIMENTS

Hereinafter, the present invention will be described in more detailed by embodiments. However, the present invention should not be contoured as being limited thereto.

Figure 3:
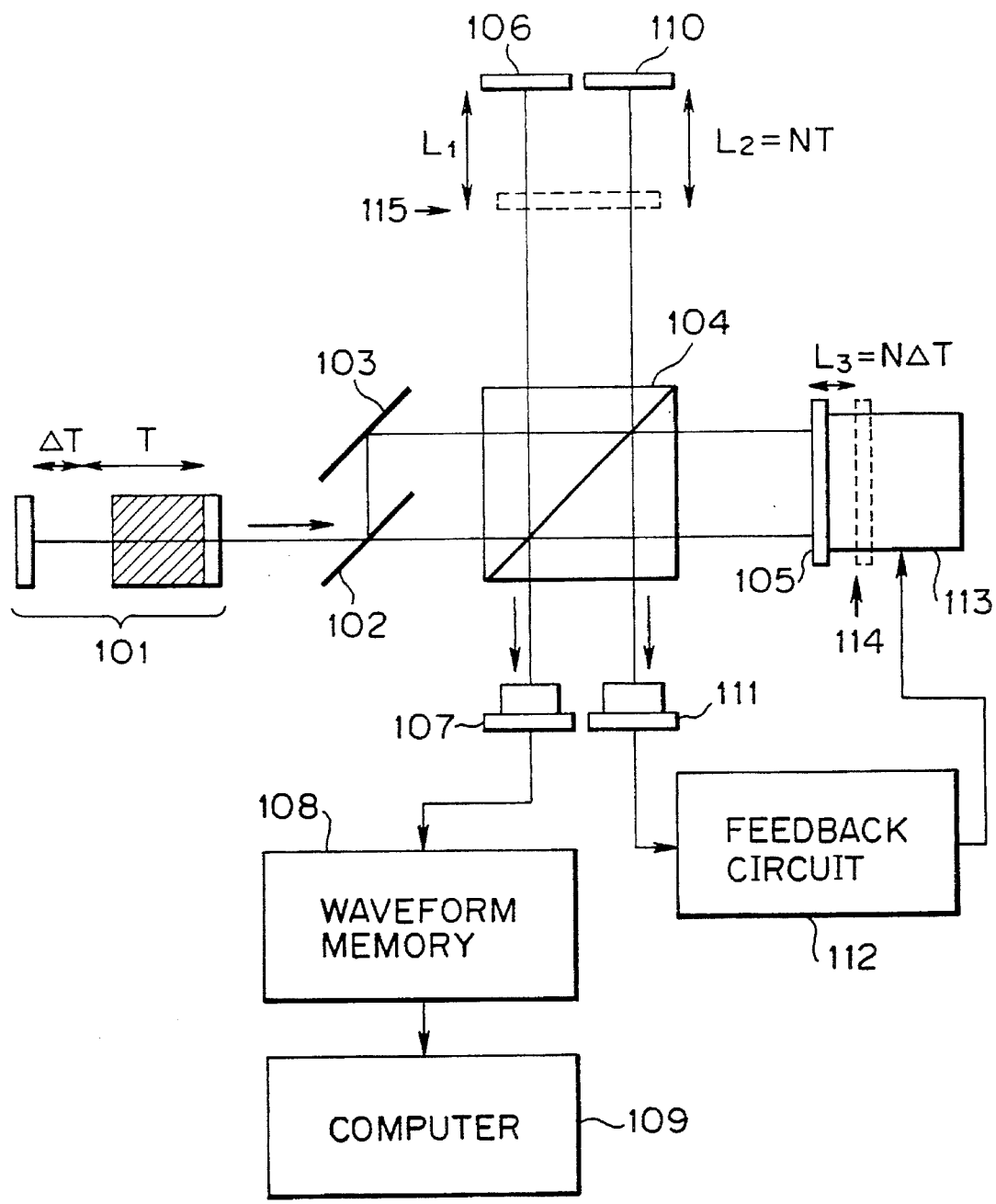
FIG. 3 is a schematic diagram showing an arrangement of a cavity dispersion measuring apparatus according to a first preferred embodiment of the present invention.

Referring now to FIG. 3, a description will be made of a basic arrangement of a cavity dispersion measuring apparatus according to a first preferred embodiment of the present invention.

In this cavity dispersion measuring apparatus of the first embodiment, a first Michelson interferometer (measuring Michelson interferometer) which comprises a single beam splitter and two end mirrors, and which divides an essentially parallel light beam into two light beams, and superimposes these light beams with each other after being propagated along different optical paths, is formed by a cube beam splitter 104, a micro translation mirror 105, and a scanning mirror 106. A photodetector 107 and a wave memory 108 constitute such a measuring means for measuring intensity of interference light from the measuring Michelson interferometer when a relative difference between two optical lengths of this measuring Michelson interferometer is varied. Furthermore, this cavity dispersion measuring apparatus is equipped with a computer 109 functioning as a calculation means for obtaining the wavelength dispersion characteristic from the phase information in the frequency domain which is obtained by Fourier-transforming waveforms of measured light intensity.

A feature of this first preferred embodiment is to employ such a second Michelson interferometer (correcting Michelson interferometer) in which a fixed mirror 110 is provided, and both the cube beam splitter 104 and the micro translation mirror 105 are shared with the above-described measuring Michelson interferometer. Then, both a beam splitter 102 and a reflecting mirror 103 are employed as an incidence means used to parally supply a light beam emitted from a laser cavity 101 under measurement to the measuring Michelson interferometer and the correcting Michelson interferometer. There are provided a photodetector 111, a feedback circuit 112, and a micro translator 113 as a feedback means for adjusting the position of the micro translation mirror 105 in order that intensity of interference light from the correcting Michelson interferometer is made constant. The scanning mirror 106 of the measuring Michelson interferometer is so designed that the position of this scanning mirror 106 is movable faking the position of the fixed mirror 110 in the correcting Michelson interferometer as the reference position. Although the fixed mirror 110 is fixed while one laser cavity is measured, this fixed mirror is movable when laser cavities having different cavity lengths are measured.

The parallel light beam produced from the laser cavity 101 under measurement is divided into two light beams by the beam splitter 102, and then the propagation directions of these two light beams (first and second light beams) are set to be parallel by the reflecting mirror 103.

The first light beam is incident upon the measuring Michelson interferometer, and is divided into two light beams by the cube beam splitter 104. Here, one divided light beam is reflected by the micro translation mirror 105, and the other split light beam is reflected by the scanning mirror 106, and then these reflected light beams are incident on the cube beam splitter 104 in which these divided light beams are superimpose with each other. This superimposed light beam is further incident on the photodetector 107 to measure a waveform of light intensity.

The second light beam which has been divided by the beam splitter 102 is incident on the correcting Michelson interferometer, and thereafter is divided into two light beams by the cube beam splitter 104. One of these two divided light beams is reflected by the micro translation mirror 105, whereas the other divided light beam is reflected by the fixed mirror 110, and then these reflected light beams are incident upon the cube beam splitter 104. In this cube beam splitter 104, these two light beams are superimposed with each other. Then, the superimposed light beam is incident on the photodetector 111.

When the micro translation mirror 105 is located at the reference position 114, the positions of the scanning mirror 106 and the fixed mirror 110 under such conditions that the optical paths of the arms of the measuring Michelson interferometer are equal, and so are those of the correcting Michelson interferometer, is assumed as a micro translation mirror reference position 115. Here, a relative optical path difference of the measuring Michelson interferometer shown in FIG. 3, is equal to a summation between an optical path difference $L_1$ caused when the scanning mirror 106 moves back from this micro translation mirror reference position 115, and a change $L_3$ in optical path differences caused by translation of the micro translation mirror 105. Similarly, a relative optical path difference of the correcting Michelson interferometer is equal to a summation between an optical path difference $L_2$ caused when the fixed mirror 110 moves back from the micro translation mirror reference position 115, and a change $L_3$ in differences of optical path lengths caused by translation of the micro translation mirror 105. When either the relative optical path difference, or the optical length T of the laser cavity 101 under measurement would be changed by $\Delta T$, under such conditions that these relative differences in optical path lengths are approximated to a value N (integer) times of the optical path T of the laser cavity under measurement, vibrations caused by the light interference phenomenon appear in the respective output signals of the two photodetectors 107 and 111.

It should be understood that the correcting Michelson interferometer is installed so as to monitor the optical length $(T+\Delta T)$ of the laser cavity 101 under measurement. The output signal from the photodetector 111 belonging to this correcting Michelson interferometer is fed back to the micro translator 113 supporting the micro translation mirror 105 by the feedback circuit 112. As a result, when a variation $\Delta T$ in the optical lengths of the laser cavity 101 under measurement happens to occur, a change in the optical path lengths $L_3 = N\Delta T$ is produced by the micro translation mirror 105. That is, the relative difference in the optical path lengths of the correcting Michelson interferometer continuously follows the above-described variation in the optical lengths T of the laser cavity 101 under measurement, so that the magnitude of the former is changed by N times of the latter optical length variation. At the same time, the relative optical path difference of the measuring Michelson interferometer is changed by the variation $\Delta T$ in the optical lengths of the laser cavity 101 under measurement multiplied by N. Under this condition, the difference $L_1$ between the optical path lengths is varied by moving the scanning mirror 106 of the measuring Michelson interferometer, and the output signals from the photodetector 107 are sequentially stored in the waveform memory 108.

Thereafter, the signal waveforms stored in this waveform memory 108 are Fourier-transformed by utilizing the computer 109. The phase obtained angular frequency of the light by this Fourier transformation, namely the phase of the Fourier component will give the phase characteristic $N\phi(\omega)$ of the laser cavity 101 under measurement for N(integer) round-trips. Based on the resultant phase change $\phi(\omega)$, the delay time $\tau_d$ for the cavity group may be calculated by the above-explained formula (6).

It should be noted that the above-explained calculation assumes that a phase imbalance between the arms of the measuring Michelson interferometer is negligible, namely when the above-described formulae (4) and (5) can be satisfied. To the contrary, when this phase imbalance is not negligible, the above-described formula (4) representative of the Fourier-transformed interference signal $S_N(\tau)$ is modified as the following formula (8):

$$F[S_N(\tau)] = t^N(\omega) t_{bias}(\omega) U(\omega) \tag{8}$$

where similarly to the above formula (4), symbol "F" indicates Fourier transformation, symbol "$S_N(\tau)$" denotes interference signal, symbol "$t(\omega)$" represents transfer function of cavity, and symbol "$U(\omega)$" is optical spectrum. Furthermore, complex valued function $t_{bias}(\omega)$ indicative of the phase imbalance is added to the formula (8). Accordingly, the phase of this complex number function $t_{bias}(\omega)$, namely the phase imbalance between both of the arms of the measuring Michelson interferometer is mixed in the phase as the complex number of the formula (8), and so the phase of the transfer function $t(\omega)$ cannot be derived therefrom. In other words, a change in phases $\phi(\omega)$ in the electric field while the light circulates inside the laser cavity under measurement, cannot be separated and derived from the formula (8).

The above-explained separation problem may be solved as follows: That is, in addition to the interference signal measurement for the integer "N", a similar measurement of the interference signal is carried out as to another integer "M" different from this integer "N". Thereafter, wavelength dispersion is calculated from the differences of the phase information in the frequency domain obtained by Fourier-transforming the intensity waveform of the measurement light as to two integers M and N. Specifically, a ratio of the Fourier transformation for two integers M and N is calculated to solve the separation problem. In this case, the integer M may be zero. A ratio of the Fourier-transformed interference signal $S_N(\tau)$ for the integer N to the Fourier-transformed interference signal $S_M(\tau)$ for the integer M is expressed by the following formula (9):

$$\frac{F[S_N(\tau)]}{F[S_M(\tau)]} = t^{N-M}(\omega) \tag{9}$$

Here, the phase imbalance $t_{bias}(\omega)$ which was expressed in the above formula (8) is completely eliminated from this formula (9) together with the optical spectrum $U(\omega)$. The phase of the formula (9) may give the phase characteristic $(N-M)\phi(\omega)$ of the laser cavity 101 under measurement for the integer (N-M) round-trips. The delay time "$\tau_d$" of the cavity group is obtained from this phase change $\phi(\omega)$ based upon the formula (6).

On the other hand, the magnitude of the ratio in the above-described formula (9) may give the change in the electric field amplitude for the integer (N-M) round-trips of the laser cavity 101 under measurement, namely (N-M) th power of the electric field gain $g^{(N-M)}(\omega)$. Based upon this electric field gain $g(\omega)$, the power gain $G(\omega)$ is calculated by the following formula (10):

$$G(\omega) = g^2(\omega) \tag{10}$$

As described above, when the interference signals are measured with respect to two integers M and N, not only the adverse influence by the phase imbalance between these two arms of the measuring Michelson interferometer can be canceled out, but also the gain of the laser cavity 101 under measurement may be additionally calculated.

Figure 4:
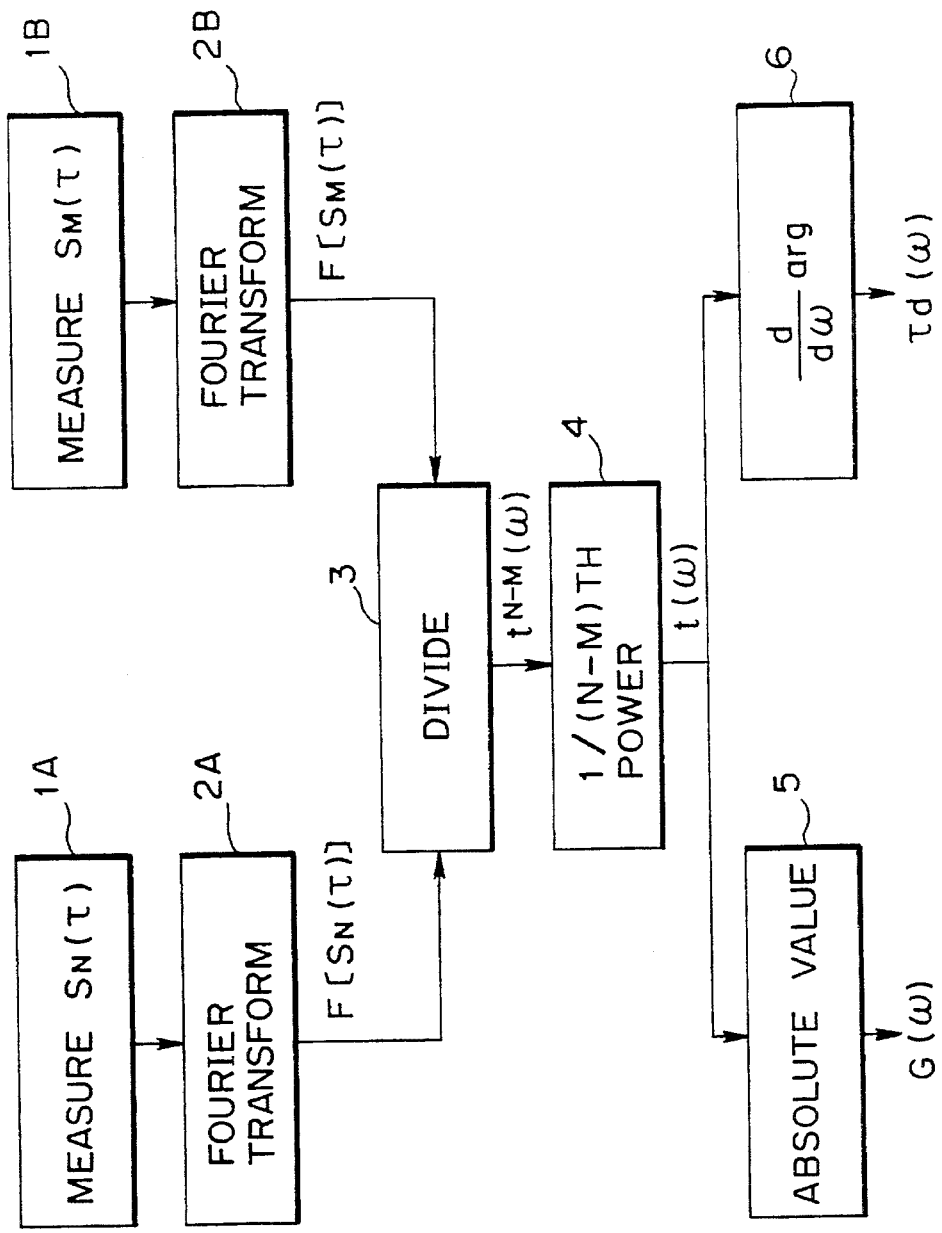
FIG. 4 is a flow chart of the analysis process carried out on results of interference signals obtained by varying differences in optical path length.

FIG. 4 is an analysis flow chart schematically explaining the process in this preferred embodiment. As represented in FIG. 4, a measurement is carried out with regard to the interference signal $SN(\tau)$ for the integer N (step 1A), and the measured interference signal $SN(\tau)$ is Fourier-transformed (step 2A) to obtain $F[SN(\tau)]$. On the other hand, another measurement is carried out with respect to the interference signal $SM(\tau)$ for the integer M, and the measured interference signal is Fourier-transformed (step 2B) to obtain $F[SM(\tau)]$. Subsequently, a ratio of the Fourier transformations is calculated based on the formula (9) (step 3), and 1/(N-M) th power of the resultant ratio is calculated (step 4)

to obtain $t(\omega)$. An absolute value of this $t(\omega)$ is calculated (step 5) to obtain the power gain $G(\omega)$. Also, the delay time $\tau_d(\omega)$ of the cavity group is calculated using the formula (6) (step 6).

Figures 5A, 5B:
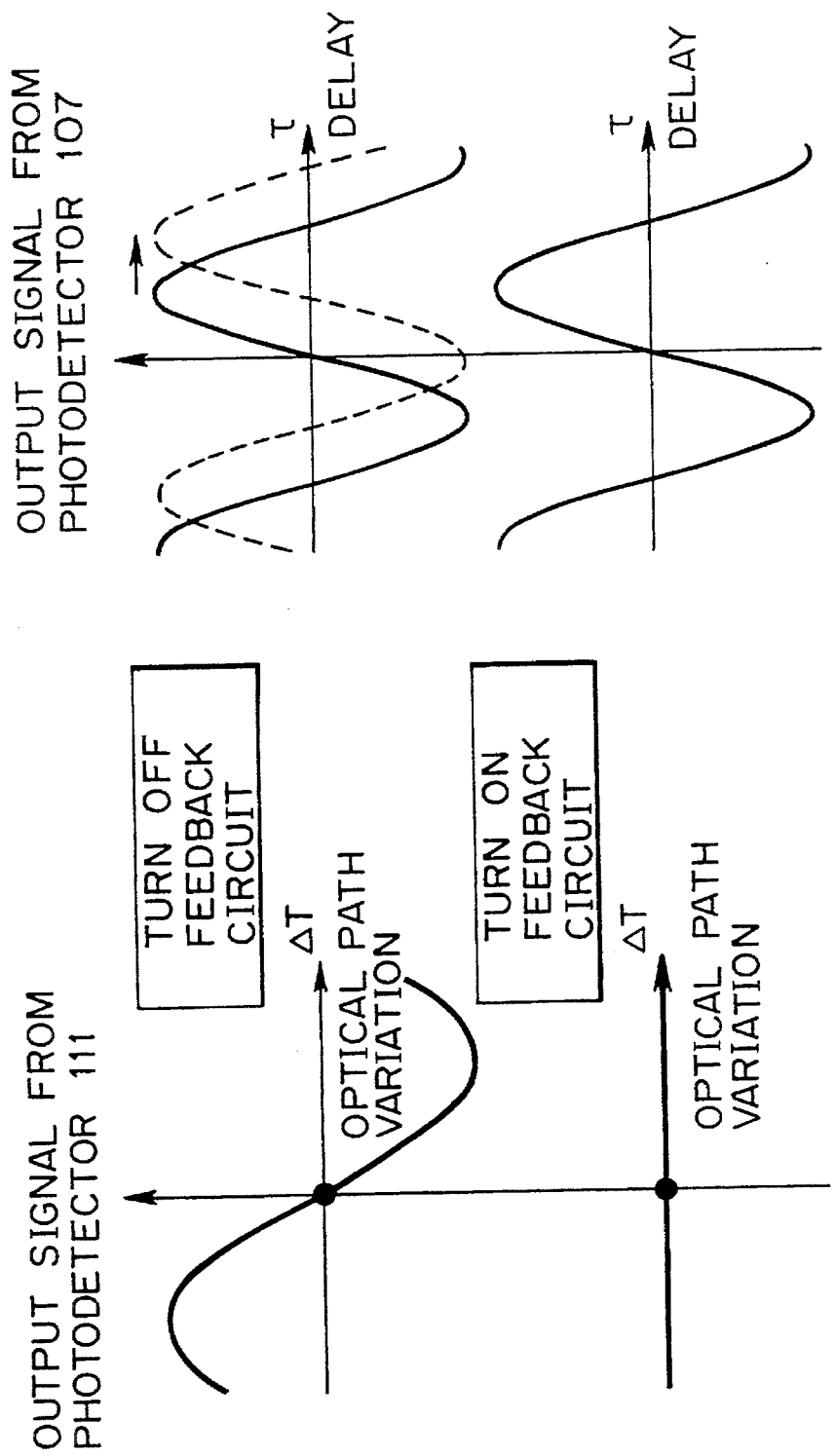
FIG. 5A is a graph showing a change in output signals of a photodetector 111 with respect to the optical path variation of the cavity.
FIG. 5B is a graph showing output signals from a photodetector 107.

FIG. 5A and FIG. 5B are explanatory diagrams for explaining function of the micro translation mirror 105. In the first preferred embodiment shown in FIG. 3, it is a major feature to constitute such an arrangement for automatically correcting the relative optical path difference of the measuring Michelson interferometer used to measure the inference signal waveforms following the change in the optical lengths of the laser cavity 101, which is monitored by the correcting Michelson interferometer. This automatic difference correction may be realized by the micro translation mirror 105 which is shared by both of the measuring/correcting Michelson interferometers. A description will now be made of this automatic difference correction. A graphic representation shown in FIG. 5A indicates a change in the output signals from the photodetector 111 belonging to the correcting Michelson interferometer with respect to the variation $\Delta T$ in the optical lengths of the laser cavity 101 under measurement. Another graphic representation indicated in FIG. 5B shows an output signal from the photodetector 107 belonging to the measuring Michelson interferometer 101. An abscissa of the graphic representation in FIG. 5B denotes delay time $\tau$ calculated by dividing the optical path difference $L_1$ on the side of the scanning mirror 106 of the measuring Michelson interferometer by the light velocity. The upper portions of these FIGS. 5A and 5B indicate output signals when the operation of the feedback circuit 112 is turned off, namely the micro translation mirror 105 is fixed at the reference position 114. The lower portions of the FIGS. 5A and 5B show output signals when the feedback circuit 112 is turned on and then the micro translation mirror 105 is moving.

Under such a state that the feedback operation of the feedback circuit 112 is turned off, when the variation $\Delta T$ in the optical lengths of the laser cavity 101 under measurement happens to occur, the output signal from the photodetector 111 represents such a sinusoidal variation as shown in the upper portion of FIG. 5A. At the same time, the output signal from the photodetector 107 as the function of the delay time $\tau$, namely, the interference signal is shifted rightward, as viewed in the upper portion of FIG. 5B. It should be noted in the graphic representation of FIG. 5B that a solid line indicates the interference signal in case of the optical length variation $\Delta T=0$, and a broken line shows the interference signal in case of an occurrence of the positive variation $\Delta T$ in the optical lengths. As described above, the interference signal is moved rightward following the variation $\Delta T$ in the optical lengths.

In general, the optical length variation $\Delta T$ of the laser cavity 101 under measurement is an unpredictable random phenomenon. On the other hand, the inference signals are sequentially acquired by varying the delay time while the measurement. During this signal acquisition, when the interference signal would be shifted randomly due to the optical length variation $\Delta T$, a certain portion of the acquired interference signal would be compressed with respect to the delay time, while another portion would be expanded. As a result, only distorted interference signals are acquired. When such distorted interference signals are Fourier-transformed, the wavelength dispersion of the laser cavity under measurement could not be obtained. This problem indeed constitutes the matter to be solved with the present invention.

In this first preferred embodiment, the micro translator 113 is driven to displace the micro translation mirror 105 in such a manner that the output signal voltage of the photodetector 111 is fixed to a marked value as shown in FIG. 5A, namely the reference voltage value in the feedback circuit 112. Specifically, the feedback circuit 112 generates a difference between the preset reference voltage value and the output signal voltage from the photodetector 111 and then supplies this difference via an integrating circuit and an amplifier to the micro translator 113. At this time, when the output signal voltage from the photodetector 111 is lower than the reference voltage value, this micro translator 113 is driven to advance the micro translation mirror 105.

Figure 6:
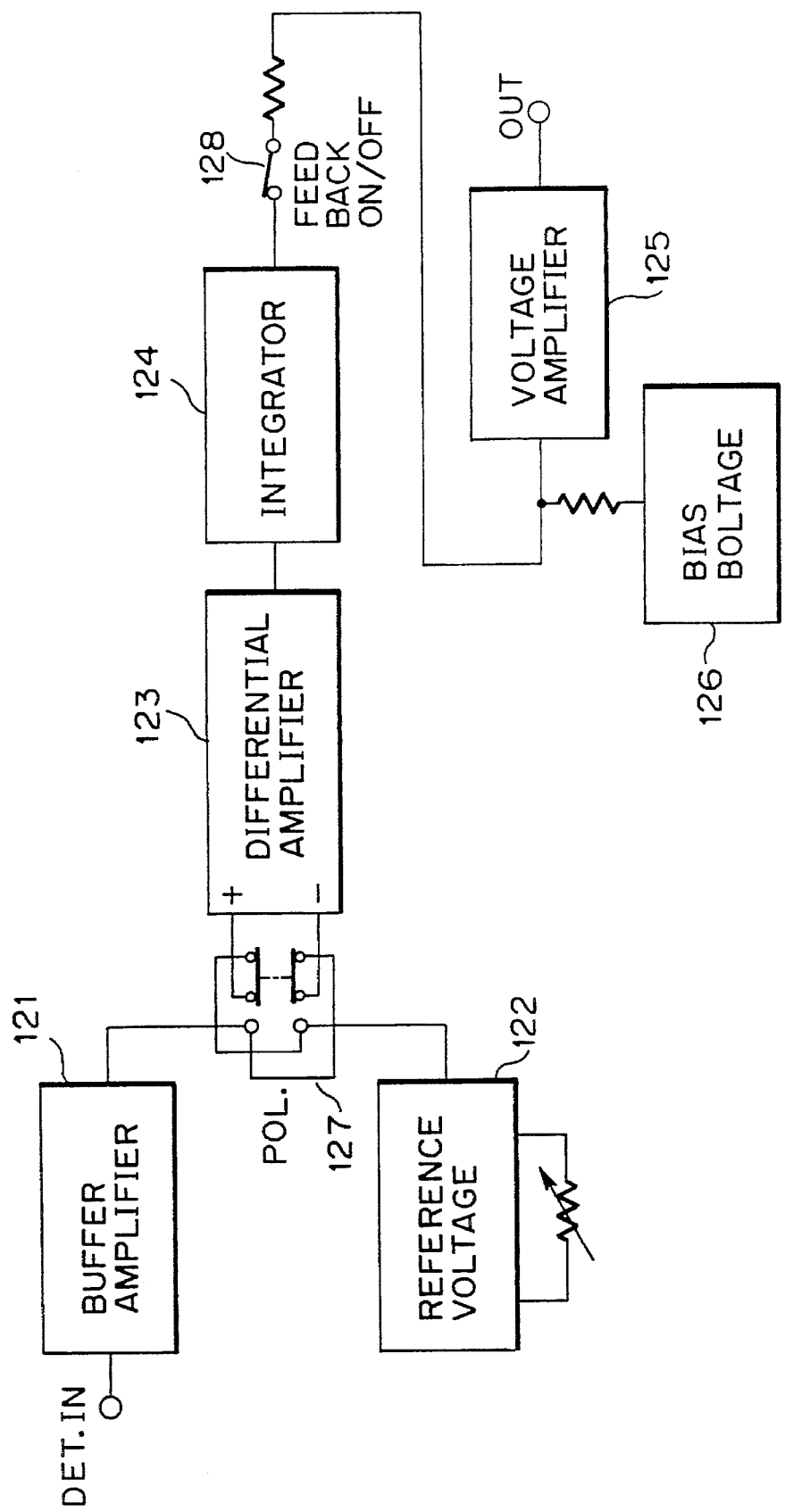
FIG. 6 is a schematic block diagram showing one example of a feedback circuit.

FIG. 6 is a schematic block diagram of the feedback circuit 112 as one example thereof. As represented in FIG. 6, the feedback circuit 112 includes a buffer amplifier 121, a voltage source 122 for setting a reference voltage, a differential amplifier 123, an integrator circuit 124, and a voltage amplifier 125. The output signal derived from the photodetector 111 is input into the buffer amplifier 121, and then both of the amplified voltage from the buffer amplifier 121 and the reference voltage set by the voltage supply 122 are applied to the differential amplifier 123 to obtain a difference between them. This difference signal is supplied via the integrator circuit 124 and the voltage amplifier 125 to the micro translator 113. It should be noted that to this supplied signal, a voltage to linearly drive the micro translator 113 is superimposed using the bias voltage supply 126. Further, this feedback circuit 112 includes a polarity changing switch 127 for switching polarities of the output signal, and another switch 128 for turning ON/OFF the entire feedback circuit 112.

This reference voltage value is preferably set to such a value near the average value of the sinusoidal output signal from the photodetector 111. This is because the change in the output signals derived from the photodetector 111 becomes maximum at this value, which is caused by the optical length variation $\Delta T$ of the laser cavity 101 under measurement. In other words, the feedback sensitivity of this feedback circuit 112 becomes maximum. When the reference voltage value is set to such a value near either the maximal value, or the minimal value of the output signal from the photodetector 111, the feedback sensitivity is close to zero, and the desired feedback operation cannot be achieved.

While this feedback circuit 112 is turned on, even when the optical length variation $\Delta T$ of the laser cavity 101 under measurement happens to occur, the output signal from the photodetector 111 is fixed to the reference voltage value as graphically illustrated in the lower portion of FIG. 5A. In this case, no shift caused by the optical length variation $\Delta T$ of the laser cavity 101 under measurement appears in the interference signal as the function of the delay time $\tau$, as graphically shown in the lower portion of FIG. 5B. This is because the relative difference in the optical path lengths of the measuring Michelson interferometer can be automatically corrected by the movement of the micro translation mirror 105 following the variation $\Delta T$ of the laser cavity 101 under measurement.

With the measuring apparatus of the first embodiment, since no shift of the interference signal caused by the optical length variation $\Delta T$ of the laser cavity 101 under measurement happens to occur, the interference signal is not shifted even when the optical length variation $\Delta T$ randomly happens to occur while the reference signals are time-sequentially acquired. As a result, such an interference signal without any distortion can be acquired, and then this non-distorted interference signal is Fourier-transformed to obtain wavelength dispersion of the laser cavity 101 under measurement.

As previously explained with reference to the formula (7) to obtain wavelength dispersion by Fourier-transforming the interference signal, it is required to calibrate the relative optical path difference the measuring Michelson interferometer with such a high precision as at least several tens nm. Also, as previously stated, this relative optical path difference is equal to the summation between the difference $L_1$ in the optical path lengths by the scanning mirror 106 and the change $L_3$ in the optical path length differences caused by movement of the micro translation mirror 105. The previous description has been made on the method for making the change $L_3$ in the optical path length differences precisely follow the optical length variation $\Delta T$ of the laser cavity 101 under measurement.

Subsequently, another description will now be made on a method for calibrating the difference $L_1$ in the optical path lengths. To carry out this calibration, in the arrangement of FIG. 3, the position of the fixed mirror 110 employed in the correcting Michelson interferometer is used as the reference position, and deviation of the scanning mirror 106 employed in the measuring Michelson interferometer from this reference position should be measured with a high precision.

To realize high precision measurement of deviation of the scanning mirror, the following method may be conceivable.

As a first measuring method, the two-frequency He—Ne stabilized laser is utilized which has been widely employed. In this measuring method, positional resolution of 5 to 10 nm could already be achieved. As a consequence, the high precision measurement of deviation of the scanning mirror required for the present invention can be realized by utilizing this measuring method. It should be understood that since the two-frequency He—Ne stabilized laser required to carry out this measuring method is considerably expensive, as compared with the normal He—Ne laser, the below-mentioned second measuring method is more suited in view of cost matter.

As the second measuring method, the monochromatic laser light source with linearly polarized light, for example, the usual He—Ne laser is used as the reference light source. Both the fixed mirror 110 and the scanning mirror 106 are used as the endmirrors to constitute a third interferometer into which the linearly-polarized monochromatic laser light is incident. This linearly-polarized laser light is converted into circularly polarized light in one arm of this third interferometer, and then the produced interference light is measured separating the orthogonal polarizations therefrom. As a result, a set of two interference signals having a 90 degree phase difference can be obtained. A length measurement resolution higher then 1/50 wavelength of the reference light source may be readily achieved by utilizing these interference signals.

Alternatively, a single interference signal can be processed by a phase-locked loop (PLL) to achieve high resolution. It should be noted that higher uniformity is required for the scanning speed of the interferometer in this method.

As the method for measuring deviation of the scanning mirror 106 with respect to the fixed mirror 110, any method other than the above-described three measuring methods may be employed. For instance, even when such a method is utilized which monitors a change in Moire fringe occurred between transmission type diffraction gratings mounted on the relevant mirrors 116 and 110, the present invention may be similarly realized.

Figure 7:
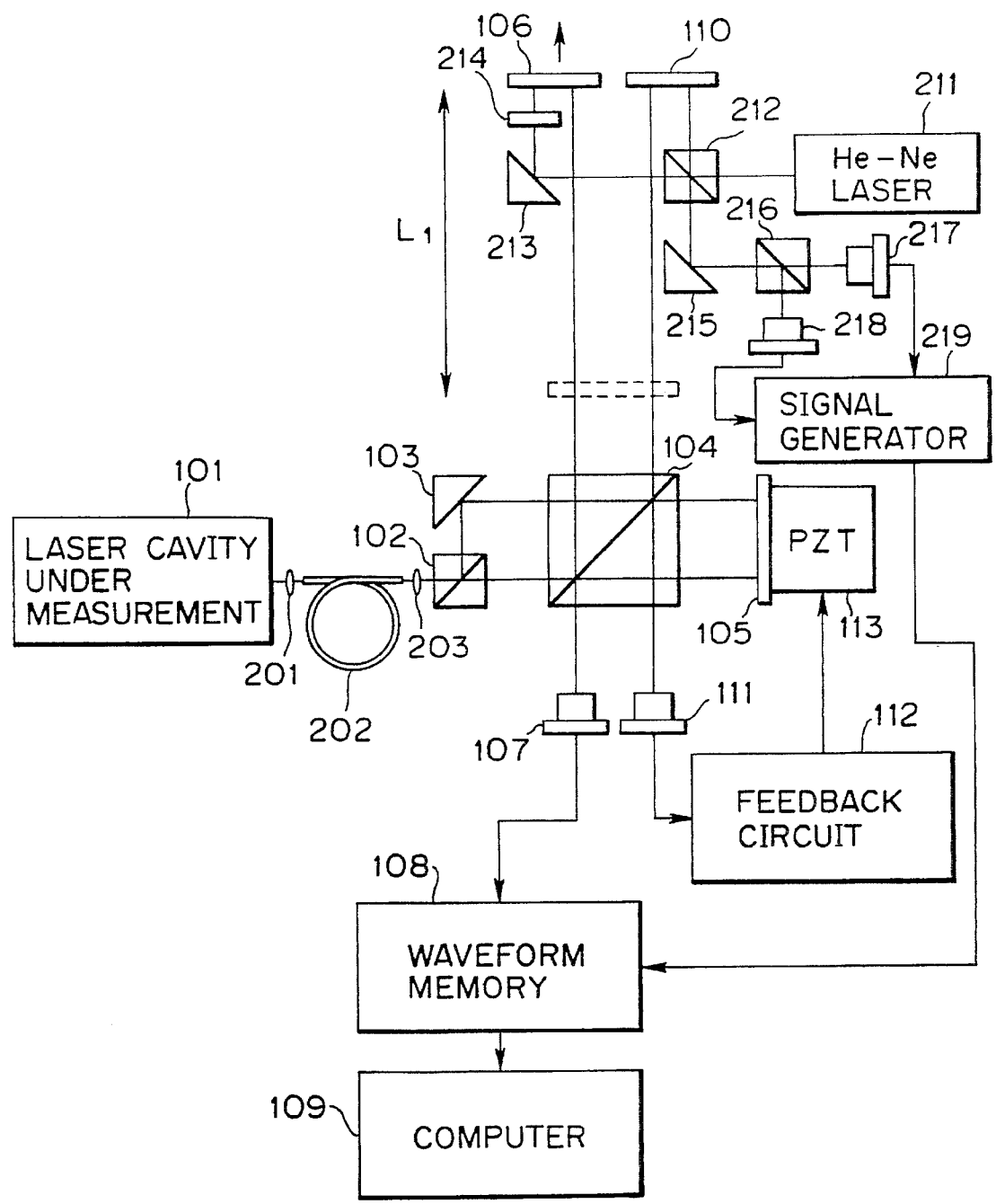
FIG. 7 a schematic diagram showing an arrangement of a cavity dispersion measuring apparatus according to a second preferred embodiment of the present invent ion.

FIG. 7 schematically indicates a cavity dispersion measuring apparatus according to a second preferred embodiment of the present invention, and represents a concrete arrangement so as to realize the present invention.

In this embodiment to increase parallelism of the light beam emitted from the laser cavity 101 under measurement, a single mode optical fiber 202 and coupling lenses 201 and 203 provided on both ends of this optical fiber 202 are employed between this laser cavity 101 and the beam splitter 102. A piezoelectric transducer (PZT) is utilized as the micro translator 113. The feedback circuit 112 drives this piezoelectric transducer in such a way that the output signal derived from the photodetector 111 for receiving the light beam from the correcting Michelson interferometer becomes equal to the preset reference voltage value.

When waveform dispersion of a titanium sapphire laser cavity having a wavelength band between 0.8 to 1.0 micrometer is measured in this embodiment, a germanium photodetector is preferably employed as the correcting photodetector 111 and the photodetector 107 for receiving the light beam from the measuring Michelson interferometer. When such a titanium sapphire laser is excited below the oscillation threshold, the wavelength of fluorescent light (namely, amplified spontaneous emission light) emitted from the cavity is within a range between 0.8 to 1.0 micrometer. Under such a condition, in order to satisfy the above described formula (7) and to prevent the aliasing at this short wavelength edge of 800 nm, the measurement of the interference signal must be carried out, i.e., the output signal from the photodetector 107 may be measured with a step of the optical path difference smaller than 400 nm.

As the method for measuring difference with a the optical path lengths with a high precision, the second of the above-described measuring method has been utilized in this example. A third Michelson interferometer is employed in order to measure deviation of the scanning mirror 106. This third Michelson interferometer is comprised of a beam splitter 212, the scanning mirror 106, and the fixed mirror 110.

Both a reflecting mirror 213 used to bend the direction of the laser light beam emitted from the monochromatic laser light source 211 toward such a direction along which this laser light beam is incident upon the scanning mirror 106 at a right angle, and a 1/8 wave plate 214 are placed in one arm of this third Michelson interferometer, i.e., the arm thereof positioned on the side of the scanning mirror 106. The laser light beam emitted from the monochromatic laser light source 211 passes through the 1/8 wave plate 214 at this arm, and then is reflected by the scanning mirror 106, and thereafter passes through the 1/8 wave plate 214 to the reverse direction. As a result of this twice propagation by the laser light beam, an equivalent effect may be achieved in which the laser light beam has passed through the 1/4 wave plate, so that the linearly polarized light is converted into the circularly polarized light.

The linearly polarized light emitted from the monochromatic laser light source 211 is incident upon this third Michelson interferometer. A He—Ne laser whose oscillation waveform is 632.8 nm is used as the monochromatic laser light source 211. The laser light derived from this monochromatic laser light source 211 is linearly polarized light having such a polarization plane inclined at 45 degrees with respect to the paper plane of FIG. 7. This linearly polarized light is divided by the beam splitter 212. One divided beam of this linearly polarized light beam is reflected by the fixed mirror 110, and then is returned to the beam splitter 212. The other divided beam of this linearly polarized light beam is reflected by the scanning mirror 106, and converted into the circularly polarized light beam, as previously explained, and thereafter returned to the beam splitter 212. Thus, two light beams which have returned to the beam splitter 212 are superimposed with each other, and the superimposed light beam forms the interference light.

The interference light having the wave length of 632.8 nm from the third Michelson interferometer is incident upon a polarizing beam splitter 216 via a reflecting mirror 215 to be separated into both a polarization component located perpendicular to the paper plane of FIG. 7 and a polarization component parallel to this paper plane. The light intensity of the respective polarization components is converted into a voltage value by the respective photodetectors 217 and 218. These two interference voltage signals have phases mutually different from each other by 90 degrees, and are input into a trigger signal generator 219. From the trigger signal generator 219, a voltage pulse is generated as the trigger signal in response to the two voltage signals every time the difference $L_1$ in the optical path lengths is varied by a half of the waved length of 632.8 nm, namely 316.4 nm. In response to this trigger signal, the waveform memory 108 sequentially stores therein the output voltage values of the photodetector 107 when this voltage pulse (trigger signal) is produced. A series of voltage signals sequentially stored in the waveform memory 108, namely the interference signals are read by the computer 109 to be processed by the Fourier transformation.

Figure 8:
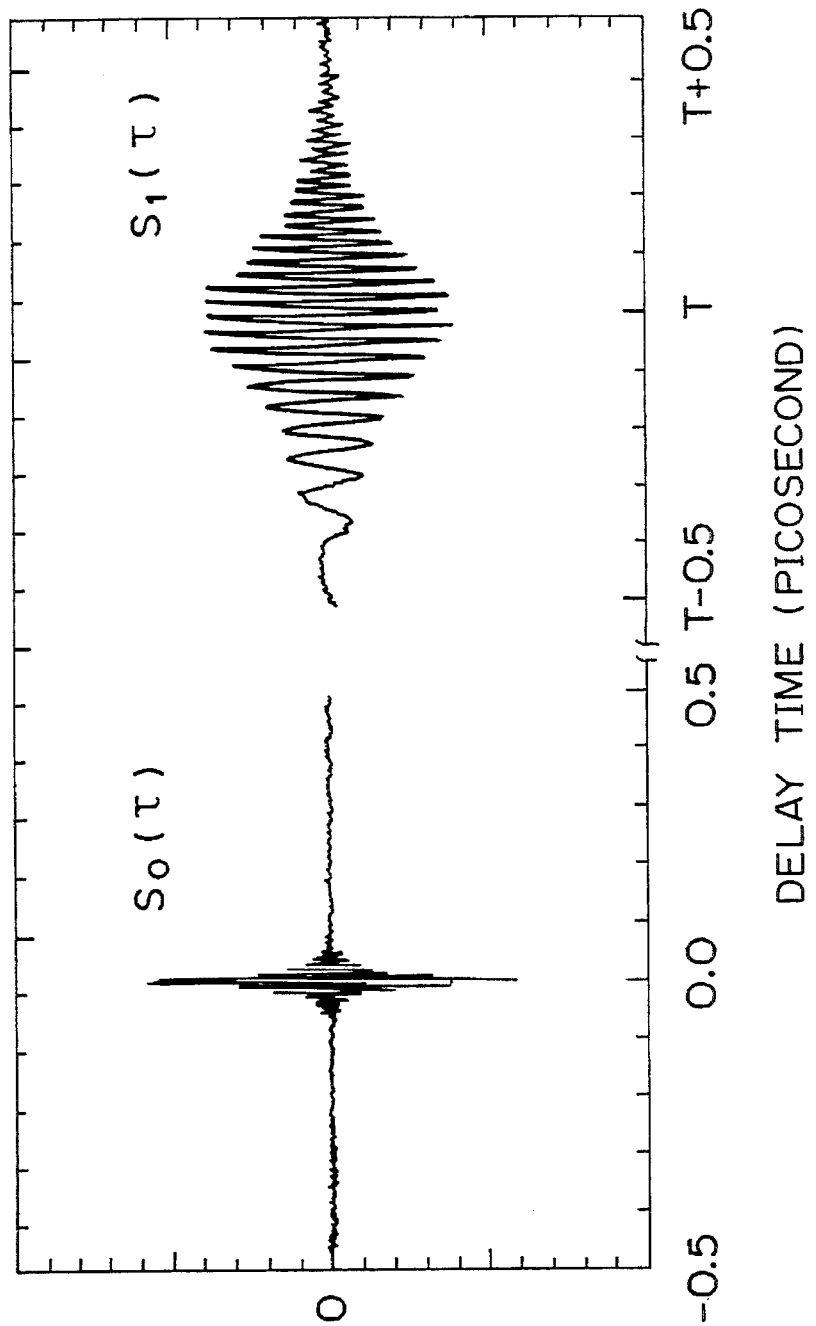
FIG. 8 is a graph showing measurement results of cavity dispersion for a titanium sapphire laser cavity.
Figure 9:
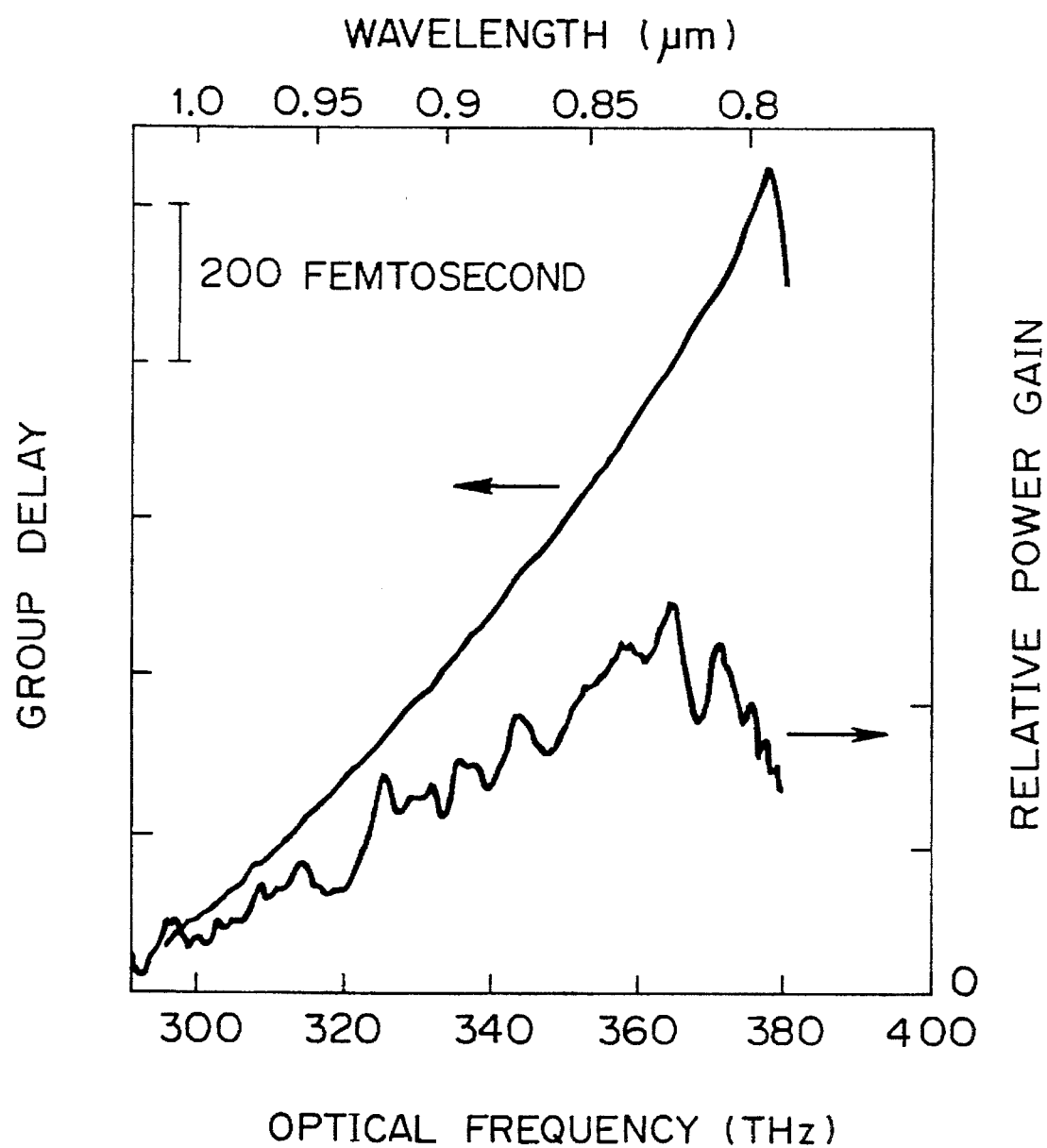
FIG. 9 is a graph showing wavelength dispersion/gain characteristics obtained by calculating interference signal waveforms shown in FIG. 8.

In FIG. 8 and FIG. 9, there are shown one example of measuring results obtained by the interference signal measuring method of this preferred embodiment. That is, FIG. 8 shows an interference signal waveform output from the photodetector 107, whereas FIG. 9 indicates a wavelength dispersion characteristic and a gain characteristic, which are obtained by calculating the above-described formula (9) for this interference signal waveform.

In FIG. 8, a signal $S_0(\tau)$ corresponds to such an interference signal that is acquired in a vicinity where the difference $L_1$ in the optical path lengths is zero, namely in a vicinity where the positions of the scanning mirror 106 and the fixed mirror 110 are coincident with the reference position 115 of the micro translation mirror. Another signal $S_1(\tau)$ corresponds to an interference signal acquired in a vicinity where the optical path length difference $L_1$ is coincident with the cavity length of the laser cavity 101 under measurement. In comparison with both of these signals $S_0(\tau)$ and $S_1(\tau)$, the interference signal $S_1(\tau)$ is considerably broadened with respect to the interference signal $S_0(\tau)$ because of the influences by the wavelength dispersion characteristic of the laser cavity under measurement. It should be understood that the apparent vibration period appearing in these signals do not actually represent the optical period but is due to the sparse plating of the interference signals.

The interference signal $S_0(\tau)$ acquired in the vicinity where the optical path length difference $L_1$ becomes zero, does not depend upon the cavity length of the laser cavity 101 under measurement, and are obtained by placing the scanning mirror 106 and the fixed mirror 110 always at the same position. To the contrary, since the interference signal $S_1(\tau)$ appears in a vicinity where the optical path length difference $L_1$ is coincident with the cavity length of the laser cavity 101 under measurement, it is required to find out proper positions where the scanning mirror 106 and the fixed mirror 110 are placed in accordance to the laser cavity 101 under measurement.

In case of such a short-length cavity as a semiconductor laser, such a position finding method is preferable that after the positions of the scanning mirror 106 and the fixed mirror 110 coincident with the reference position 115 of the micro translation mirror are found out, a position where the interference signal $S_1(\tau)$ appears is found out while both the scanning mirror 106 and the fixed mirror 110 are moved backward from the above-mentioned positions. A similar effect may be achieved by that the micro translation mirror 105 is moved forward from the reference position 115. It is desirable to turn off the feedback operation of the feedback circuit 112 during this position finding operation of the fixed mirror 110. This is because if this feedback circuit 112 would be turned on, then the interference signal can be hardly observed following the movement of either the fixed mirror 110 or the micro translation mirror 105.

In case of such a long cavity exceeding several cm, the above-explained method is not realistic because there is a limitation in the range of the mirror moving mechanism. Thus, the below mentioned method may be utilized. That is, the length of the cavity of the laser cavity 101 under measurement is precalculated based on the thickness data and the refractive index data for the optical components employed in the cavity, and also the intervals among these optical components employed in the cavity, and the scanning mirror 106 and the fixed mirror 110 are provisionally positioned back from the reference position 115 of the micro translation mirror by the precalculated cavity length. Subsequently, while the position of the scanning mirror 106 is moved forward and/or backward about this provisionally set position, the output voltage value of the measuring photodetector 107 is monitored so as to find out the position where the interference signal $S_1(\tau)$ appears. Similarly, while the fixed mirror 110 is moved forward and/or backward about this provisionally set position, the output signal value of the correcting photodetector 111 is monitored to find out the position where the interference signal $S_1(\tau)$ appears. It should be noted that even when the micro translation mirror 105 is moved forward and/or backward about the provisionally set position after both the scanning mirror 106 and the fixed mirror 110 have been provisionally set, a similar effect may be achieved. Similar to the above-described case, it is desirable to turn off the feedback circuit 112 during the position finding operation of the fixed mirror 110. In case of the measurement for this titanium sapphire laser, it could be found out the position where the interference signal $S_1(\tau)$ appears using this method. In other words, both the scanning mirror 106 and the fixed mirror 110 are provisionally set to the position corresponding to the cavity length of 118.4 cm calculated based on the intervals between the mirrors employed in the cavity, and the length/refractive index data about the titanium sapphire rod, and thereafter the position where the interference signal $S_1(\tau)$ appears could be found out within a distance of 2 mm around this provisionally set position.

When a pulsed laser oscillation is achievable by exciting the laser cavity 101 under measurement above the threshold, the cavity length can be calculated from the repetition period of this pulse train based on the above-explained formula (1). The positions of the scanning mirror 106 and the fixed mirror 110 are provisionally set to the calculated value so as to find out the position where the interference signal $S_1(\tau)$ appears in a similar manner to the above manner.

Overall operations of the interference signal measuring apparatus shown in FIG. 6 with this preferred embodiment will now be described more in detail.

First, after the position of the fixed mirror 110 where the interference signal $S_1(\tau)$ appears has been found out, the reference voltage value of the feedback circuit 112 is set to a value near the average value of the output voltage from the photodetector 111. The feedback operation is commenced. Namely, the micro translation apparatus (i.e., piezoelectric element) 113 mounted on the fine scanning mirror 105 is started to be driven.

Subsequently, the scanning mirror 106 is advanced from the position where the interference signal $S_1(\tau)$ is observed up to the position where this signal completely disappears. Here, the memory contents of the waveform memory 108 are erased, and then the data writing position is reset to the top address of the waveform memory 108. Next, when the scanning mirror 106 is gradually returned from the position where the interference signal $S_1(\tau)$ completely disappears, the trigger signal is applied to the waveform memory 108 every time the optical path length difference $L_1$ is changed by 316.4 nm, and then the output voltage signal values from the photodetector 107 are sequentially stored into the waveform memory 108.

It should be noted that the expression "gradual movement" implies such a scanning speed as the analog-to-digital converting operation and the data writing operation of the waveform memory 108 can follow the resulting repetition of the trigger signal produced by the trigger signal generator 219. For instance, when the analog-to-digital conversion speed and the data writing speed of the waveform memory 108 are assumed to be 20 kHz, the maximum possible speed for the optical path length difference change of the interferometer becomes 20,000 (/sec)×316.4 (nm)=6.328 (mm/sec), whereas the maximum possible speed for the movement of the scanning mirror 106 becomes a half of the above speed, namely 3.164 mm/sec. The reason of this halving, is that since the laser light is bounced on the surface of the scanning mirror 106, two times of the movement of the scanning mirror 106 represents the change in the optical paths.

The range of the delay time differences required for the interference signal measurement is approximately twice the amount of the group delay time change of the laser cavity 101 under measurement across the wavelength range of the emitted fluorescent light (amplified spontaneous emission light). For instance, in the titanium sapphire laser cavity shown in FIG. 9, a total amount of the group delay time change is at most in the order of 1.0 picosecond within the fluorescent wavelength range of 0.8 to 10 micrometers. As a result, the necessary range for the delay time differences becomes on the order of 2 picoseconds. This may be confirmed also from the fact that the delay time range observing the interference signal $S_1(\tau)$ does not exceed 2 picoseconds in FIG. 8.

In the actual measurement, the scanning operation was carried out over the changing range for the delay time differences of 4.4 picoseconds. This delay time difference changing range corresponds to 0.66 mm if this scanning range is converted into the optical path length changing range. When the scanning operation is performed within this range (0.66 mm) at the maximum possible speed of the scanning mirror 106, time required to measure the interference signal becomes at most 0.1 second. Even when the scanning operation is carried out at slower speeds, the interference signal measurement is completed within 1 second. It should be noted that various known translation mechanism may be utilized for the scanning operation. In this embodiment, the translation stage equipped with the ball bearing guide was employed which was driven by the low cost DC motor. Also, the total number of data acquisition points became 4,016, and the Fourier transformation of these data could be completed within 2 to 3 seconds by using the general-purpose 32-bit personal computer as the computer 109.

In this measurement embodiment, the interference signal $S_0(\tau)$ was measured in addition to another interference signal $S_1(\tau)$. The measuring procedure of this interference signal $S_0(\tau)$ is the same as that of the above-described interference signal $S_1(\tau)$ except for that both the scanning mirror 106 and the fixed mirror 110 are placed near the reference position 115 for the micro translation mirror. The time required to measure this interference signal $S_0(\tau)$ and the calculation time required for Fourier-transforming the data are similar to those for the other interference signal $S_1(\tau)$.

Based upon the formula (9), a calculation was made of a ratio of the Fourier transform of the interference signal $S_1(\tau)$ to the Fourier transform of the interference signal $S_0(\tau)$, whereby the transfer function $t(\omega)$ of the laser cavity under measurement was obtained, and further the group delay time was calculated based on the phase $\phi(\omega)$ of this transfer function. The relative power gain was calculated based on the magnitude of the transfer function for the laser cavity. These calculations about the Fourier transform ratio, the phase of the transfer function, and the magnitude thereof, and furthermore the display operation were completed within 1 second with employment of the above-described computer.

An example of the thus calculated wavelength dispersion characteristic and gain characteristic is illustrated in FIG. 9. The overall time required to measure the interference signals and also to perform the various calculations may be less than approximately 10 seconds. Even when 2 minutes are added to this overall time period of 10 seconds, during which both the scanning mirror 106 and the fixed mirror 110 are moved and the positions where the interference waveforms appear are found out, the entire measurement time period never exceeds 3 minutes. As a consequence, such a quick measurement of the cavity wavelength dispersion could be realized.

The featured points of the present invention will now be described in comparison with the above-explained conventional measuring apparatuses.

Figure 1:
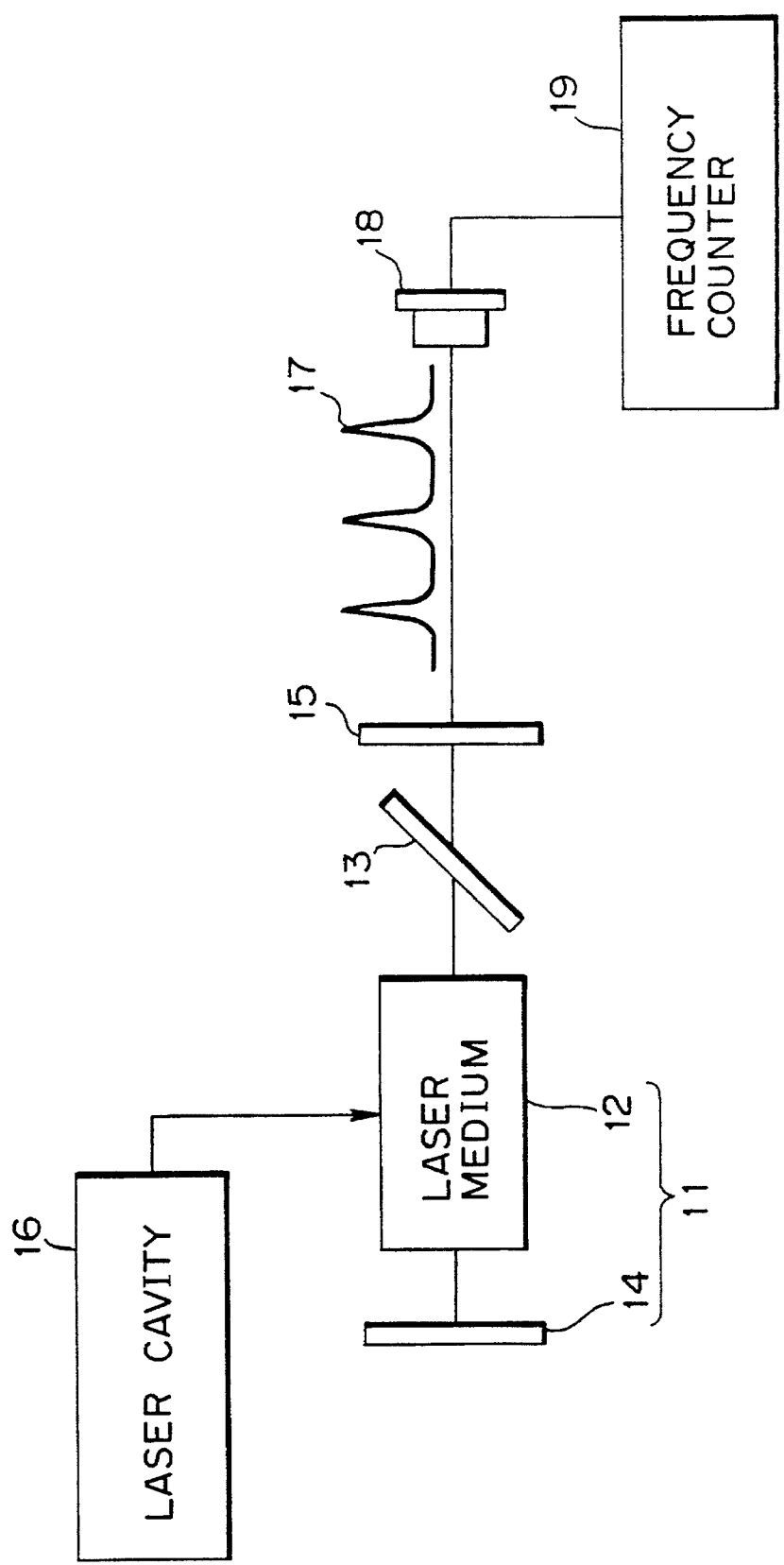
FIG. 1 is a schematic diagram showing the first conventional method to measure cavity dispersion.
Figure 2:
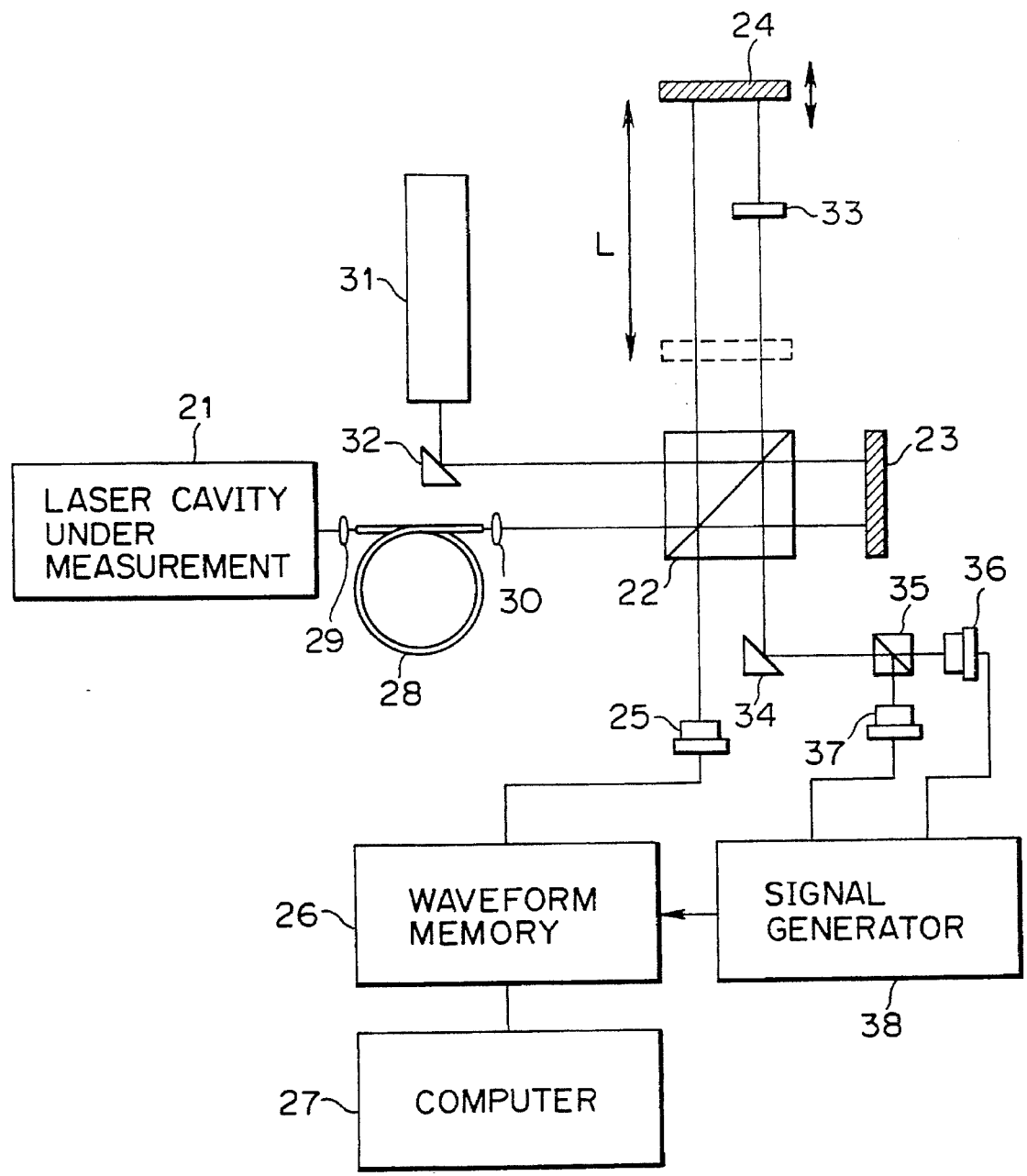
FIG. 2 is a schematic diagram showing the second conventional method to measure cavity dispersion.

At first glance, such a technical point that two laser light beams are incident upon a single Michelson interferometer in the prior art measuring apparatus shown in FIG. 2, is similar to that of the measuring apparatus indicated in FIG. 3 according to the first preferred embodiment of the present invention. However, there is clearly the following difference:

That is, in the conventional measuring apparatus, the light beam which is incident via the reflecting mirror 32 upon the single Michelson interferometer and is traveled parallel to the measuring light beam emitted from the laser cavity 21 and incident via the coupling lens 30 on this Michelson interferometer, is the light beam emitted from another monochromatic laser 31, here specifically the He—Ne laser. The light beam emitted from this He—Ne laser 31 is employed to monitor the change in the relative differences L of the optical path lengths in the conventional measuring apparatus, and therefore may be referred to a "calibration light beam".

However, the problems caused by the variation in the optical path lengths of the laser cavity under measurement cannot be solved by such a conventional calibration light beam. Originally, the present invention has the major object to solve the above-mentioned problems. This is because the calibration light beam is produced by the He—Ne laser 31 independent of the laser cavity 21 under measurement. That is to say, the variation in the He—Ne laser 31 is merely reflected into this calibration light beam.

To the contrary, with the first preferred embodiment of the present invention, both of the two light beams incident upon the Michelson interferometer are originally emitted from the laser cavity 101 under measurement. In other words, the light beam emitted by the laser cavity 101 under measurement is divided by the beam splitter 102 into two divided beams, both of which are incident on the Michelson interferometer. The variation in the optical path lengths of the laser cavity 101 under measurement is detected, so that the problems caused by the variation in the optical path lengths of the laser cavity under measurement can be solved.

On the other hand, with the second preferred embodiment of the present invention, the light beam may be additionally employed which corresponds to the calibration light beam used to monitor the change in the relative difference in the optical path lengths, as previously described.

While the present invention has been described in detail, the cavity dispersion measuring method of the present invention can generally measure the cavity dispersion characteristic irrelevant to the sort of means for causing the laser cavity under measurement to generate pulsed laser light. Moreover, such a measurement can be carried out irrelevant to such an aspect as to whether or not the wavelength selecting element is employed within the laser cavity under measurement, and under conditions that the length of the laser cavity under measurement is not restricted by the response time of the photodetector or the electronic circuit, and also there is no adverse influence caused by the optical length variation of the laser cavity under measurement. Also with the present invention, the cavity dispersion measuring method may be applied not only to the experiments carried out when the ultrashort light pulse laser is developed, but also to the test and adjustment after manufacturing. Furthermore, this cavity dispersion measuring method may be utilized in the test and adjustment in the laser installation cites, resulting in great effects in the industrial field.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for measuring cavity dispersion, comprising the steps of:

dividing a light beam emitted from a laser cavity under measurement into first, second, third, and fourth light beams;

propagating said first light beam and said second light beam along a first optical path and a second optical path respectively, and superimposing two light beams with each other which have passed through said first and second optical paths respectively to cause said two light beams to interfere with each other, thereby producing a first interference light beam;

propagating said third light beam and said fourth light beam along a third optical path whose optical path length is variable and a fourth optical path whose path length is fixed respectively, and superimposing two light beams with each other which have passed through said third and fourth optical paths respectively to cause said two light beams to interfere with each other, thereby producing a second interference light beam;

controlling said optical path length of the third optical path in order that intensity of said second interference light beam is kept constant;

adjusting said optical path length of said first optical path in correspondence with said controlled optical path length of the third optical path;

measuring said first interference light to obtain a waveform of the light intensity while varying said optical path length of said second optical path in a vicinity where a relative optical path difference between said optical path length of said second optical path and said adjusted optical path length of said first optical path length, becomes N times of a cavity length of said laser cavity under measurement, N being any integer other than zero; and Fourier-transforming said waveform of the measured light intensity to obtain phase information in a frequency domain, whereby wavelength dispersion of said laser cavity is obtained based on said phase information.

2. A cavity dispersion measuring method as claimed in claim 1, wherein in a vicinity where a relative difference between said optical path length of the third optical path and said optical path length of the fourth optical path becomes N times of said cavity length of said laser cavity under measurement, said optical path length of the third optical path is varied.

3. A cavity dispersion measuring method as claimed in claim 1, further comprising the steps of:

measuring said first interference light beam to obtain a waveform of light intensity while varying the optical path length of said second optical path in a vicinity where said relative difference between said optical path length of the second light path and said optical path length of the first light path becomes M times of the cavity length of said laser cavity, M being any integer other than said integer N; and acquiring phase information at a frequency domain obtained by Fourier-transforming said light intensity waveform measured at the preceding step, whereby said waveform dispersion of the laser cavity under measurement is obtained based on a difference between said phase information measured for said integer N and said phase information measured for said integer M.

4. A cavity dispersion measuring apparatus comprising:

a first Michelson interferometer including a beam splitter, a first end mirror, and a second end mirror, in which a substantially parallel light beam is divided into two light beams, and after these two split light beams are propagated through mutually different optical paths respectively, said two divided light beams are superimposed with each other thereby to output a first interference light beam;

a second Michelson interferometer including said beam splitter and said first end mirror, which are shared with said first Michelson interferometer, and also a third end mirror, for outputting a second interference light beam;

incident means for causing a light beam emitted from a laser cavity under measurement to be incident upon said first Michelson interferometer and second Michelson interferometer in a parallel form;

first moving means for moving the position of said first end mirror along the incident direction of said light beam;

feedback means for controlling said first moving means in such a manner that intensity of said second interference light derived from said second Michelson interferometer becomes constant;

second moving means for moving said second end mirror in such a manner that a relative difference between the lengths of said two optical paths of said first Michelson interferometer is successively varied as a result, the position of said second end mirror has been moved relative to the position of said third end mirror of said second Michelson interferometer;

measuring means for measuring intensity of said first interference light beam from said first Michelson interferometer in correspondence with the variation in said relative difference between the optical path lengths of the first Michelson interferometer; and calculating means for Fourier-transforming a waveform of light intensity measured by said measuring means to obtain phase information in a frequency domain, whereby a wavelength dispersion characteristic is obtained based on said phase information.

5. A cavity dispersion measuring apparatus as claimed in claim 4, wherein said relative difference between said two optical path lengths of each of said first and second Michelson interferometers is set to approximately N times of a cavity length of said laser cavity under measurement, N being any integer other than zero.

6. A cavity dispersion measuring apparatus as claimed in claim 4, wherein said incident means includes optical means for increasing a parallelism of the light beam emitted from said laser cavity under measurement.

7. A cavity dispersion measuring apparatus as claimed in claim 4, wherein said calculating means includes means for Fourier-transforming two light intensity waveforms measured with respect to said laser cavity corresponding to the same measuring subject, respectively, to obtain two phase informations in the frequency domain, thereby acquiring the wavelength dispersion characteristic based on the difference between said phase informations.

8. A cavity dispersion measuring apparatus as claimed in claim 4, wherein said first moving means is arranged by a piezoelectric element.

9. A cavity dispersion measuring apparatus as claimed in claim 4, further comprising:

a third Michelson interferometer for measuring the difference between the relative difference between said two optical path lengths of said first Michelson interferometer and the relative difference between said two optical path lengths of said second Michelson interferometer under condition that said second end mirror and said third mirror are an end mirror.

10. A cavity dispersion measuring apparatus as claimed in claim 4, wherein said feedback means generates a difference between intensity of said second interference light beam and a preset reference voltage value, and outputs said difference therefrom through an integrating circuit and an amplifier.

\* \* \* \* \*